United States Patent
Sokald et al.

(10) Patent No.: US 11,146,844 B1
(45) Date of Patent: Oct. 12, 2021

(54) DEVICES, SYSTEMS AND PROCESSES FOR FACILITATING SEAMLESS USE OF TUNERS ACROSS MULTIPLE DEVICES WITHIN A LOCAL AREA NETWORK

(71) Applicant: DISH Network L.L.C., Englewood, CO (US)

(72) Inventors: Mark John Sokald, Roxborough, CO (US); Jason Paul Carlson, Denver, CO (US); Seth Byerley, Parker, CO (US); Yunfeng Yang, Aurora, CO (US); John Huynh, Thornton, CO (US); Gowtham Ram Ramkumar, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/886,073

(22) Filed: May 28, 2020

(51) Int. Cl.
| | |
|---|---|
| *H04N 21/426* | (2011.01) |
| *H04N 21/438* | (2011.01) |
| *H04N 21/472* | (2011.01) |
| *H04N 21/436* | (2011.01) |

(52) U.S. Cl.
CPC ..... *H04N 21/4263* (2013.01); *H04N 21/4383* (2013.01); *H04N 21/43615* (2013.01); *H04N 21/47211* (2013.01)

(58) Field of Classification Search
CPC ......... H04N 21/4383; H04N 21/43615; H04N 21/47211; H04N 21/4263
See application file for complete search history.

(56) References Cited

U.S. PATENT DOCUMENTS

| 7,917,008 B1 | 3/2011 | Lee | |
| 8,798,444 B1* | 8/2014 | Crandall | H04N 21/4622 386/292 |
| 2008/0059884 A1 | 3/2008 | Ellis et al. | |
| 2008/0155618 A1* | 6/2008 | Grady | H04N 21/4583 725/97 |

(Continued)

OTHER PUBLICATIONS

U.S. Appl. No. 16/885,972, filed May 28, 2020.

(Continued)

*Primary Examiner* — John R Schnurr
(74) *Attorney, Agent, or Firm* — Wash Park IP Ltd.; John T. Kennedy

(57) ABSTRACT

Devices, systems, and processes for facilitating seamless use of tuners across multiple devices within a LAN are described and may include use of a first user device, communicatively coupled to the LAN, that includes a first hardware processor configured to execute first, non-transient, computer instructions for facilitating a first seamless tuner engine configured to identify at least one first tuner. A second user device, communicatively coupled to the LAN, may include a second hardware processor configured to execute second, non-transient, computer instructions for facilitating a second seamless tuner configured to identify at least one second tuner. At least one of, if not each, of seamless tuner engines may be configured to generate a universal tuner directory identifying availability of each the tuners. The universal tuner directory may be populated and tuners allocated based upon an emergency broadcast, auto-tune, PPV, original content, re-run, or Joey request type.

20 Claims, 7 Drawing Sheets

(56) References Cited

U.S. PATENT DOCUMENTS

| | | |
|---|---|---|
| 2008/0232312 A1 | 9/2008 | Roh et al. |
| 2008/0273856 A1 | 11/2008 | Bumgardner et al. |
| 2009/0210533 A1* | 8/2009 | Verhaegh ............ G06F 16/1837 709/226 |
| 2014/0281489 A1 | 9/2014 | Peterka |
| 2015/0052568 A1* | 2/2015 | Glennon .............. H04N 21/482 725/100 |
| 2015/0195478 A1* | 7/2015 | Hieb ........................ H04N 5/50 348/731 |

OTHER PUBLICATIONS

U.S. Appl. No. 16/886,190, filed May 28, 2020.
U.S. Appl. No. 16/886,190, Non-final Office Action, dated Feb. 4, 2021.
U.S. Appl. No. 16/885,972, Non-Final Office Action, dated Apr. 21, 2021.
U.S. Appl. No. 16/885,972, Non-Final Office Action Response & Terminal disclaimer, dated Jul. 21, 2021.
U.S. Appl. No. 16/885,972, Notice of Allowance, dated Aug. 10, 2021.
U.S. Appl. No. 16/886,190, Non-final Office Action Response, dated May 20, 2021.
U.S. Appl. No. 17/470,086, CON Application filed, dated Sep. 9, 2021.

* cited by examiner

STB (A) TUNER DIRECTORY

| TUNER | REQUEST | TIME | USER |
|---|---|---|---|
| (1) | AUTO | 2:00 – 4:30 | SUSAN |
| (2) | OC-1 | 12:00 - 8:00 | DAVID |
| UNAVAIL | PPV | 10:00 - 7:00 | STEVE |

STB (B) TUNER DIRECTORY

| TUNER | REQUEST | TIME | USER |
|---|---|---|---|
| (3) | OC-2 | 7:00 -10:00 | JULIE |
| (4) | | FREE | |

STB (C) TUNER DIRECTORY

| TUNER | REQUEST | TIME | USER |
|---|---|---|---|
| (5) | RR | 12:00 - 7:30 | JAMES |

FIG. 2

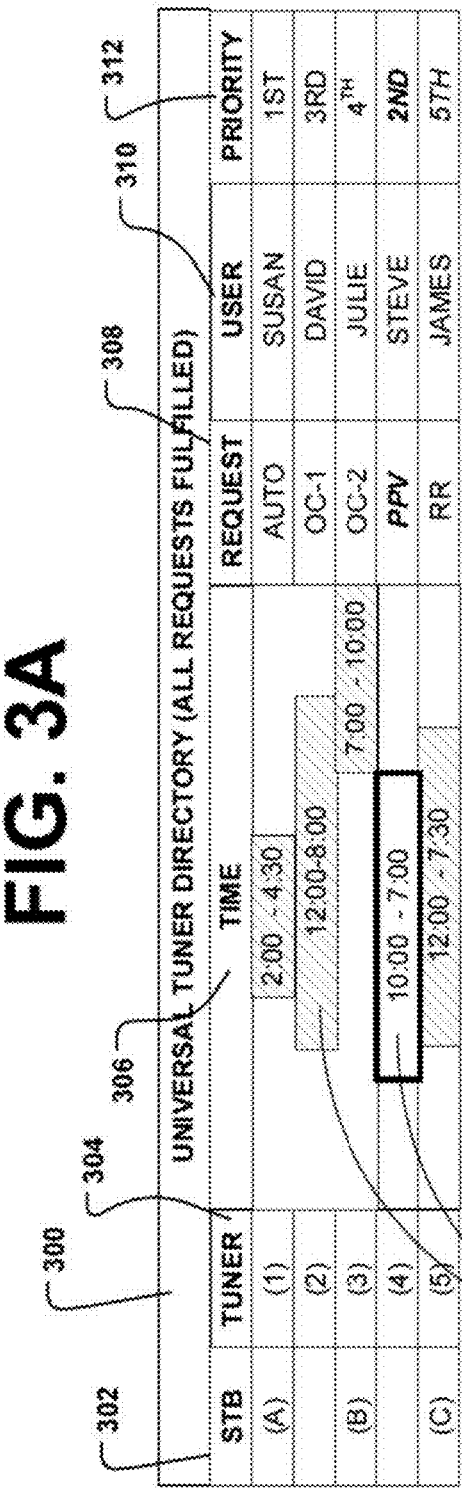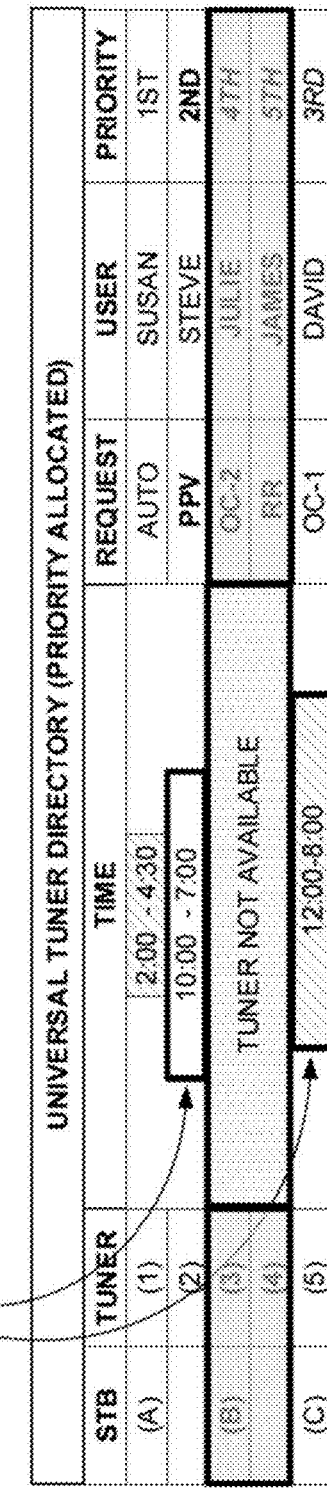
FIG. 3A
FIG. 3B

DEVICES, SYSTEMS AND PROCESSES FOR FACILITATING SEAMLESS USE OF TUNERS ACROSS MULTIPLE DEVICES WITHIN A LOCAL AREA NETWORK

CROSS REFERENCE TO RELATED APPLICATIONS

The present application relates to co-pending U.S. application Ser. No. 16/885,972 which was co-filed herewith on 28 May 2020, in the name of inventors Yunfeng Yang, John Huynh, Gowtham Ramkumar, Mark Sokald, Jason Carlson and Seth Byerley, is entitled "DEVICES, SYSTEMS AND PROCESSES FOR FACILITATING SEAMLESS DIGITAL VIDEO RECORDING OF CONTENT AND USE THEREOF ACROSS MULTIPLE DEVICES WITHIN A LOCAL AREA NETWORK" (herein, "Seamless DVRs"), and is further identified by Wash Park IP (WPIP) docket number P00058.US.01. The present application also relates to co-pending U.S. Application Serial No. 16/886,190, which was co-filed herewith on 28 May 2020, in the name of inventors Jason Carlson, John Huynh, and Yunfeng Yang, is entitled "DEVICES, SYSTEMS AND PROCESSES FOR FACILITATING SEAMLESS USE OF TIMERS ACROSS MULTIPLE DEVICES WITHIN A LOCAL AREA NETWORK" (herein, "Seamless Timers"), and is further identified by WPIP docket number P00060.US.01. The entire contents of each of the above identified applications are incorporated herein by reference.

TECHNICAL FIELD

The technology described herein generally relates to devices, systems, and processes for facilitating use of tuners to receive digital content. The technology described herein also generally relates to the use of multiple tuners, spread across multiple devices interconnected across a local area network. The technology described herein also generally relates to the allocation of scarce resources, such as tuners, across a local area network to facilitate the providing of multiple content streams wherein, absent such allocation of resources, access to certain content streams would not be achievable.

BACKGROUND

Today, users commonly use content receiving devices, such as cable set top boxes, satellite set top boxes, streaming devices, such as those provided by ROKU, AMAZON, and others, and other devices to receive various forms of content. Herein and for purposes of efficient description only, such receiving devices are identified as each being an "STB". STBs may receive various forms of content, including analog content and/or digitally encoded content. Such content may include video programs, television shows, movies, video clips, and the like, audio programs, and other forms of content. Often multiple users are associated together, such as members of a family, or other localized group of individuals. Such associations of user are each referred to herein as being within a "household." Users in such households often desire to receive, often at a same time, given instances of content, such as a specific episode of a television show, a movie, or other content; such specific instances of content each being identifiable herein by a "title."

Yet and despite the association of two or more users in a household, each user of a household commonly is required, with respect to their STB(s), to receive and process separate instance of a given title using those resources provided by their STB. For example, a first user in a given household desiring to receive an instance of a show is commonly required to dedicate one or more resources in their STB to the reception, demodulation, decrypting, and otherwise processing of that content. If one or more of such resources are not then available, access to the content may not be achievable. Such resources are commonly identified herein as each being, separately and/or in combination, a "tuner," however, it is to be appreciated that such resources may be separately identifiable and/or useful to a given STB. Accordingly, as used herein a "tuner" refers to a hardware, software and/or combination of hardware and software resource that is provided within and/or accessible by a given user with respect to a given one or more STBs. A "tuner" resource may be accessible using an Internet or other server, or otherwise.

It is to be appreciated, however, that such tuners are often not available to a given user to receive a desired show, at a given time. This scenario may arise even when multiple tuners are located within a household, and each of such tuners are not, at that given time, in use. To overcome such constraints, content providers, such as cable and satellite TV companies, often provide additional tuners in a given STB. Some STBs include over a dozen tuners, such as the DISH Network HOPPER 3 STB, which includes 16 separate tuners. Thus, often multiple tuners are provided, such tuners are not commonly used at the same time, and undue waste and expense occurs. Accordingly, devices, systems, and methods for addressing these and other concerns are needed.

SUMMARY

The various embodiments of the present disclosure relate in general to devices, systems, and processes for facilitating seamless use of tuners across multiple devices within a local area network. In accordance with at least one embodiment of the present disclosure, a system for facilitating seamless use of tuners may include a first user device communicatively coupled to a local area network (LAN). The first user device may include a first hardware processor configured to execute first, non-transient, computer instructions for facilitating a first seamless tuner engine. The first seamless tuner engine may be configured to identify at least one first tuner. The system may include a second user device that may be communicatively coupled to the LAN. The second user device may include a second hardware processor configured to execute second, non-transient, computer instructions for facilitating a second seamless tuner engine. The second seamless tuner engine may be configured to identify at least one second tuner. For at least one embodiment, at least one, if not each, of the first seamless tuner engine and the second seamless tuner engine may be further configured to generate a universal tuner directory identifying availability of each of the at least one first tuner and the at least one second tuner.

For at least one embodiment, the universal tuner directory may be populated based upon a request type. A request type may include a Joey request type. For at least one embodiment, at least one of the first tuner and the second tuner may be configured as a linked main tuner. For a Joey request type, an available link main tuner may be allocated to a Joey.

For at least one embodiment, the request type may include one of an auto-tune request type, a pay-per-view request type, an original content request type, and a re-run request type. For at least one embodiment, the auto-tune request type may have a higher separate priority than the pay-per-view (PPV) request type. For at least one embodiment, the PPV request type may have a higher priority than the original content request type. For at least one embodiment, the original content request type may have a higher priority than the re-run request type.

For at least one embodiment, the system may include a third user device communicatively coupled to the local area network. The third user device may include a third hardware processor configured to execute third, non-transient, computer instructions for facilitating a third seamless tuner engine. The third seamless tuner engine may be configured to identify at least one third tuner. The universal tuner directory may be further configured to identify the at least one third tuner as being available for use by at least one of the first user device, the second user device, and the third user device.

For at least one embodiment, the universal tuner directory may identify a separate priority for each requested use of each of the at least one first tuner, the at least one second tuner, and the at least one third tuner.

For at least one embodiment, the first user device may include a first storage module. The first storage module may include a first tuner database configured to store first tuner information about each of the at least one first tuners. The first tuner information may identify any first uses for at least one, if not each, of the at least one first tuners.

For at last one embodiment, the second user device may include a second storage module. The second storage module may include a second tuner database configured to store second tuner information about each of the at least one second tuners. The second tuner information may identify any second uses for each of the at least one second tuners. For at least one embodiment, at least one, if not each, of the first tuner information and the second tuner information may be used to populate the universal tuner directory.

For at least one embodiment, the first and second seamless tuner engines may cooperatively process a new tuner request based upon the first uses, the second uses, and a priority of the new tuner request. For at least one embodiment, the priority may be one of an emergency broadcast message, an auto-tune, a pay-per-view, an original content, and a rerun.

For at least one embodiment, the new tuner request may be received from a Joey and the first seamless tuner engine may be further configured to determine whether one of the at least one first tuners is available for use as a linked main tuner.

For at least one embodiment, the first user device may include a first storage module configured to store user preference information in a user database. For at least one embodiment, the first computer instructions may be configured to instruct the first seamless tuner engine to populate the universal tuner directory in view of the user preference information.

In accordance with at least one embodiment of the present disclosure, a process for seamless use of tuners provided by multiple devices within a local area network may include the operations of maintaining, by a first user device, a first device tuner directory. The first user device may identify a first tuner. The process may also include receiving, by the first user device and from a second user device, a second user device tuner directory. The second user device tuner directory may identify a second tuner. The process may also include generating, by the first user device, a universal tuner directory based on contents of the first user device tuner directory and the second user device tuner directory. The universal tuner directory may identify current tuner requests for each of the first tuner and the second tuner.

For at least one embodiment, the universal tuner directory may be independently second generated by the second user device.

For at least one embodiment, the process may include prioritizing a new request based on a request type. The request type may be selected from a highest to lowest ranked ordering comprising at least two or more of an emergency broadcast message, an auto-tune request, a PPV request, an original content request, a rerun request, and a Joey request.

For at least one embodiment, the process may include second prioritizing the new request based on a received user identifier. A first user identifier may be associated with the first user device and a second user identifier may be associated with the second user device. And the process may further include giving the new request a highest priority when the received user identifier is the second user identifier and the new request for use of the second tuner.

In accordance with at least one embodiment of the present disclosure, a user device, configured for use in facilitating seamless tuner use across multiple devices within a local area network (LAN), may include a first receiver module including a first tuner. The user device may include a hardware processor configured to execute non-transient computer instructions for facilitating a seamless tuner engine. The user device may include a storage module for a tuner database. The user device may include an interface module configured to communicatively couple the user device with a second user device over the LAN. For at least one embodiment, the second user device may include a second tuner. For at least one embodiment, the seamless tuner engine may be configured to facilitate one or more operations including: generating a universal tuner directory identifying any current and scheduled uses of each of the first tuner and the second tuner; and establishing a session between the first user device and the second user device, via the LAN. For at least one embodiment and during the session, use of the first tuner and the second tuner may be prioritized based on at least a request type.

For at least one embodiment, the request types may include at least one of an auto-tune request, a pay-per-view request, an original content request, a re-run request, and a Joey request.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 2 is an illustrative representation of multiple tuners provided by STBs within a household and requests for use of such tuners and in accordance with at least one embodiment of the present disclosure to facilitate seamless use of tuners across multiple devices within a local area network.

FIG. 3A is an illustrative representation of a universal directory populated without prioritization, where all tuner requests can be fulfilled, and in accordance with at least one embodiment of the present disclosure to facilitate seamless use of tuners across multiple devices within a local area network.

FIG. 3B is an illustrative representation of a universal directory showing prioritized allocations of tuners available on then active STBs within a household, where all tuner requests cannot be fulfilled, and in accordance with at least one embodiment of the present disclosure to facilitate seamless use of tuners across multiple devices within a local area network.

DETAILED DESCRIPTION

The various embodiments described herein are directed to devices, systems, and processes for facilitating seamless digital video recording of content and use thereof across multiple devices within a local area network.

Figure 1:
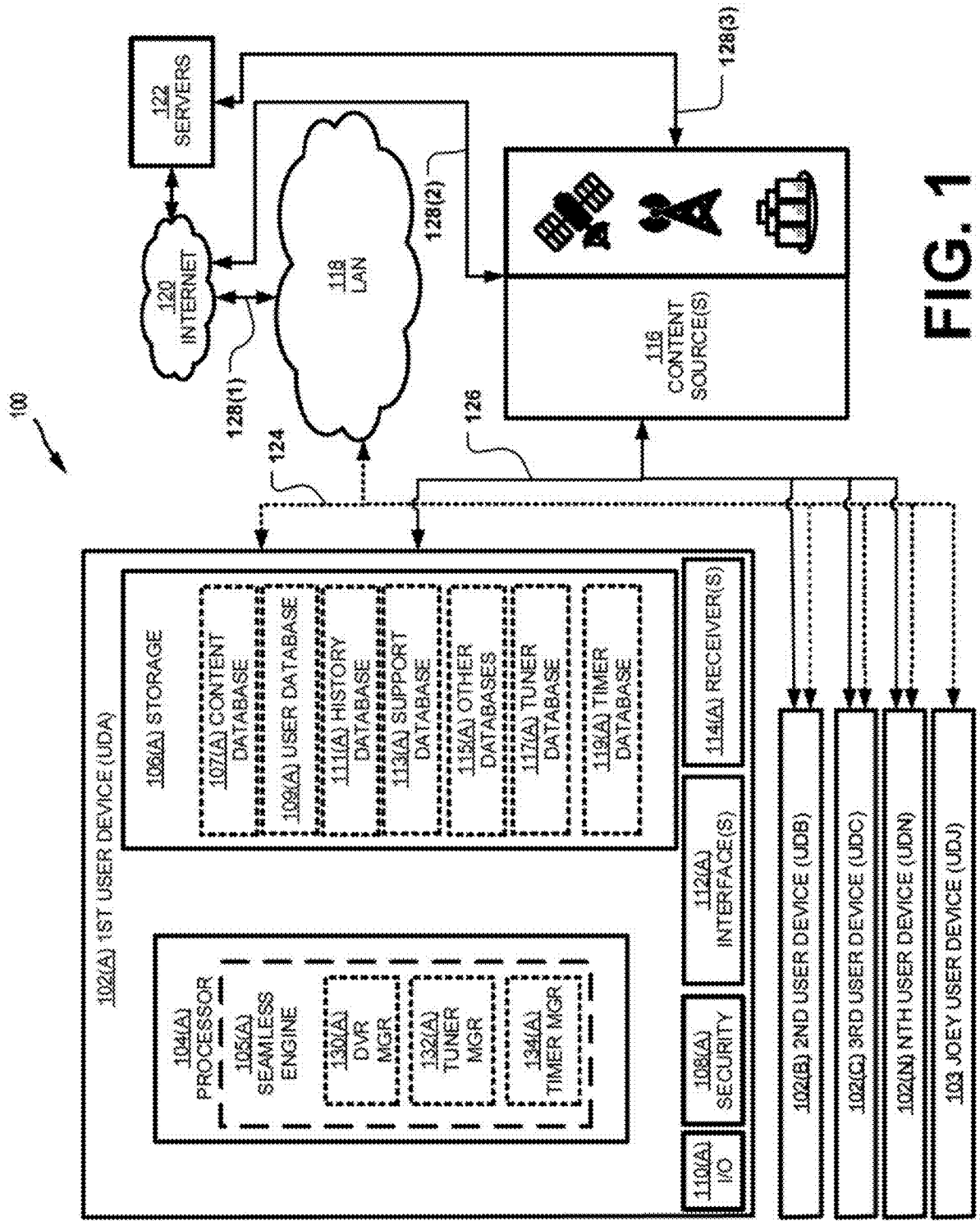
FIG. 1 is a schematic diagram of a system configured, in accordance with at least one embodiment of the present disclosure, to facilitate seamless use of tuners across multiple devices within a local area network.

As shown in FIG. 1, and as briefly discussed above, each user of a household commonly is associated with one or more user devices, such as user devices 102(A), 102(B) and 102(N) (herein, the "(A)," "(B)," and "(N)" indicate unique user devices). Each of the user devices may be the same type of device or different. Non-limiting examples of user devices 102 include cable/satellite set-top boxes, smart televisions, streaming devices, laptop and desktop computers, table computing devices, smartphones, gaming consoles, and otherwise. Each user device 102 commonly includes a processor module 104, a storage module 106, a security module 108, an input/output ("I/O") module 110, one or more interface modules 112, such as a local area network ("LAN") interface, and one or more receiver modules 114. Each of these components are further discussed below. Additional components may be used in any given user device 102 and a component may be provided as integrated into a given user device 102, directly coupled to a given user device 102, indirectly coupled to a given user device 102, or otherwise communicatively and/or operationally coupled to a given user device 102. One or more less capable devices (which are referred to herein as "Joeys") 103 may also be used in a given system 100. For at least one embodiment, a Joey 103 differs, at a minimum, from a user device 102 by not having one or more receivers 114. Accordingly, a Joey 103 is typically configured to utilize a receiver 114 provided in a user device 102 for reception and signal processing of content provided by a content source 116.

Each user device 102 provides a user thereof with access to a digital storage device, such as a DVR. The DVR may be provided by the corresponding storage module 106, and controlled by and/or accessed using one or more other user device components, such as the I/O module 110. For at least one embodiment, a user device 102 may be configured to facilitate one or more Seamless DVR features and functions. For a Joey 103, DVR functions may be provided by, and accessible using, a linked main/master user device 102.

As further shown in FIG. 1, the various user devices 102(A)-102(N) may be communicatively coupled to one or more content sources 116 by one or more receiver links 126. Non-limiting examples of such content sources 116 include satellite distribution services, such as those provided by DIRECTV, DISH and others, cable system providers, such as those provided by COX, XFINITY, and others, terrestrial content broadcasters, such as those provided by local television stations within one or more defined areas, streaming/on-line content system providers, such as NETFLIX, SLING TV, HULU, YOUTUBE, DISNEY+, HBO NOW, other over the top sources, and other sources. It is to be appreciated that a given user device 102 may be configured to receive content on a demand, request, scheduled, or other basis. A given user device 102 may be configured to receive content from multiple content sources 116 and store one or more instances of such content in the storage module 106. Such content may be identified by a source, title and/or program ID and may require use of certain encryption and/or digital rights management ("DRM") keys and/or profiles to decrypt, present, and otherwise access.

The receiver links 126 may use any form and/or combination of any known and/or later arising wired, wireless and/or combinations thereof communications technologies; non-limiting examples include WIFI, Ethernet, coaxial cables, CAT 5/6 cabling, BLUETOOTH, fiber optic cables, and others. A household may be configured to provide a single content source node, such as and not by limitation, a satellite television antenna and receiver, by which user devices 102 within the household may be coupled to one or more content sources. Such content source nodes are well known in the art. Other examples of content source nodes may include routers, gateways, and other devices.

As further shown in FIG. 1, each of the user devices 102 and the Joeys 103 may be communicatively coupled to a LAN 118 by one or more internal links 124. User devices 102 and Joeys 103 may also, and/or alternatively, be communicatively coupled used MOCA (multimedia over coax), or other communications and/or networking technologies. Interconnections between combinations of two or more user devices 102, Joeys 103 and/or other devices, such as Internet servers 122, are collectively identified herein as arising over a LAN 118.

For other embodiments, the LAN 118 may be configured for use with two or more households, as may arise in a multi-unit dwelling. When two or more household are communicatively coupled using the LAN 118, as desired, appropriate firewalls and other logical and/or physical separations may be provided between such households. The internal links 124 may use any desired known and/or later arising wired, wireless and/or combinations thereof communications and network technologies; non-limiting examples include WIFI, Ethernet, coaxial cables, CAT 5/6 cabling, BLUETOOTH, fiber optic cables, and others.

As discussed further below, the LAN 118 provides a communications pathway by which the various user devices 102 and/or Joeys 103 within a household, at any given time communicate. The LAN 118 may have a name or SSID associated with it. Such name may hidden or publicly detected, identified. Using the LAN 118, a common universal directory may be populated. Such common universal directory may include a directory of recorded content, as taught by Seamless DVRs, tuners available, in use, and scheduled for use, as described herein, timers scheduled and/or available for scheduling, as taught by Seamless Timers and otherwise. A universal directory may identify various component and/or elements of the system 100, as provided by two or more user devices 102 and/or Joeys 103, connected thereto and/or as accessible, at any given time, within a given household.

A universal directory may be seamlessly accessible by one or more of the user devices 102 and/or Joeys 103, even when the universal directory is not directly stored using a storage module 106 provided by that given user device 102 or accessed by a Joey 103. That is, for at least one embodiment, a universal directory may be populated by and accessible from any of one or more user devices 102 and/or Joeys 103 then communicatively coupled to a given LAN 118, where each such user device 102 and/or Joey 103 is configured to facilitate one or more of Seamless DVR, Seamless Timer and/or Seamless Tuner features and functions, where Seamless Tuner features and functions include, but are not limited to such features and functions described in the present disclosure.

As discussed above and for at least one embodiment, access to the LAN 118 may be limited to members (user devices 102 and/or Joeys 103) associated with a given household. Such access may be limited using any known or later arising network access control technologies. Non-limiting examples of such access control technologies include the use of passwords, MAC address listings, and others. For another embodiment, access to the LAN 118 may be open to user devices not associated with a given household. It is to be appreciated that when user devices are external to a given household, additional and/or different DRM protocols, tuning protocols, timer protocols, or the like may be used and/or required with respect to all and/or some of the information identified on a universal directory.

For at least one embodiment, the internal links 124 may use any currently known or later arising communications and/or networking technologies. For at least one embodiment, the internal links 124 may be established using peer-to-peer communications technologies. For at least one embodiment, the internal links 124 may use a hub and spoke configuration, with a router of other device facilitating formation of the LAN 118.

For at least one embodiment, the LAN 118 may be self-forming. Self-formation of the LAN 118 may arise when a user device 102 and/or Joey 103 known to be associated with a member/user of a household (or other approved collection of user and their associated user devices), communicatively enters into, by change of physical location, powering on, turning of a networking interface element or otherwise, an area in which a LAN 118 is formed or is to be formed. For example, upon entry of a second user device 102(B) into an area, such as a house, containing a first user device 102(A), the second user device 102(B) may announce its presence to a wireless router, such as a WIFI router, to which the first user device 102(A) is already communicatively coupled. Each of the first user device 102(A) and the second user device 102(B), and/or any other user devices then connected to the LAN 118 and desiring to participate in a universal directory service facilitated over such LAN 118, may be configured to initiate a discovery and LAN formation process between the first user device 102 (A), the second user device 102(B) and any other user devices 102(N). Such LAN 118, as discussed below, may be used to facilitate one or more of Seamless DVR, Seamless Timer and/or Seamless tuner features and functions.

Similarly, a third user device 102(C) may communicatively enter an area wherein the LAN 118 already exists between the first user device 102(A) and the second user device 102(B). Upon the third user device 102(C) announcing its presence, one or more of the first and/or second user devices 102(A)/(B), if not both, may accept entry of the third user device 102(C) onto the LAN 118. Such LAN entry may provide for a limited entry privileges, full entry privileges, or otherwise to the third user device 102(C).

For example, entry privileges may be used to determine which tuners a given user device 102, such as the third user device 102(C) may be permitted to access, which tuners, if not all, provided by other user devices 102 are identifiable to the third user device 102(C), which of the third user device's tuners are discoverable to other user devices 102 and/or Joeys 103, which of any other user devices 102 and/or Joeys 103 may access tuners provided by the third user device 102(C), and otherwise. It is to be appreciated, that such privileges may be provided and/or not provided in view of one or more considerations including, but not limited to, digital rights management ("DRM") restrictions, parental control settings, and otherwise. For at least one embodiment, each user device 102 and Joey 103 participating in the LAN 118, may be populated with a same, unique, or some permutation thereof, universal directory of tuners accessible via the LAN 118. For at least one embodiment, a first universal directory available to a first user device 102(A), may vary from a second universal directory available to a second user device 102(B), and the like.

As further shown in FIG. 1 and for at least one embodiment, the LAN 118, content sources 116 and servers 122 may be communicatively coupled, via the Internet 120, directly, via or other wide area networks and/or communications technologies, services and/or systems, or otherwise, by one or more external links, such as external links 128 (1)-128(3). It is to be appreciated that the Internet 120 may provide access by one or more of the user devices 102, Joeys 103, content sources 116, LAN 118, and the like to one or more servers 122. Such servers 122 may be used in providing access to a given tuner, authenticating access to a given tuner, or otherwise. The external links 128 may use any known or later arising communications and/or networking technologies. For at least one embodiment, one or more external net links may be established using common cellular communications technologies including, but not limited to, 3G/4G/5G technologies. For at least one embodiment, one or more external links 128 may be established using any desired communications technology of which non-limiting examples include Ethernet, the Internet, private networks, public networks, the plain old telephone service (POTS), microwave links, fiber-optics, wireless, wired, cellular, other networking communications technologies, and/or combinations thereof.

Processor Module (104)

Referring again to FIG. 1, a user device 102 may include one or more processor modules 104 configured to provide computer implemented software and hardware engines including, for example and not by limitation, a seamless engine 105. For purposes of facilitating Seamless Tuners, the processor module 104 may include a seamless engine 105. The seamless engine 105 may be further configured to include one or more second processing modules including, but not limited to, a DVR manager 130, a tuner manager 132, and a timer manager 134. For at least one embodiment, such managers may be subordinate to the seamless engine 105. For another embodiment, one or more of such managers may be used independently and/or in conjunction with the seamless engine 105. Other computer implemented engines and/or managers may be provided for in other embodiments.

The processor module 104 may be configured to provide any desired data and/or signal processing capabilities. For at least one embodiment, the processor module 104 may have access to one or more non-transitory processor readable instructions, including instructions for executing one or more applications, engines, and/or processes configured to instruct the processor to perform computer executable operations (hereafter, "computer instructions"). The processor module 104 may use any known or later arising processor capable of providing and/or supporting the features and functions of a given user device as needed for any given intended use thereof and in accordance with one or more of the various embodiments of the present disclosure.

For at least one non-limiting embodiment, the processor module 104 may be configured as and/or has the capabilities of a 32-bit or 64-bit, multi-core ARM based processor. For at least one embodiment, the processor module 104 may use, in whole or in part, one or more backend systems, such as server systems or otherwise. Computer instructions may include firmware and software instructions, and associated data for use in operating a given user device 102, as executed by the processor module 104. Such computer instructions provide computer executable operations that facilitate one or more features or functions of a given user device 102 and in accordance with one or more embodiments of the present disclosure.

Seamless Engine (105)

For at least one embodiment, the processor module 104 may be configured to implement computer instructions for configuring a user device 102 to function as a seamless tuner. To facilitate such functionality, computer instructions for facilitating a seamless engine 105 may be executed by the processor module 104. For at least one embodiment, the seamless engine 105 may be executed by each processor module 104 for those user devices 102 participating on a given LAN 118. The seamless engine 105 may be a combination of a hardware processor and computer instructions. In other embodiments, the seamless engine 105 may be implemented by a dedicated or separate processing component. The seamless engine 105 may be configured to provide a given user device 102 with capabilities of designating, defining, generating, managing, manipulating, accessing, and/or providing seamless tuner features and functions to, with and/or between two or more user devices 102, and/or Joeys 103, on a LAN 118.

The seamless engine 105 may be configured to permit certain known, discoverable, unknown, or other user devices 102 and/or Joeys 103 to join in a given LAN 118 such that tuners on such user devices 102 may be seamlessly accessed by and between the various user devices 102 and/or Joeys 103 on the LAN 118. As discussed above, for at least one embodiment, access to the LAN 118 may be limited to members of a household and/or other authorized users.

For at least one embodiment, the seamless engine 105 may be configured to facilitate the seamless sharing of tuners on a LAN 118, where such tuners are provided by one or more user devices 102, such as a first user device 102(A). For at least one embodiment, a given user device 102 may be designated as a "master" user device. One or more other user devices 102 on a given LAN 118, may be each designated as a "remote" user devices, such as a second user device 102(B). Tuners, DVRs, and other components provided by a given user device may correspondingly also be so designated. The designation of a user device as a given master or remote may vary over time. For at least one embodiment, a LAN 118 commonly includes at least one master user device 102 and at least one of a remote user device and/or a Joey.

For at least one embodiment, the seamless engine 105 may be configured to facilitate varying roles. That is, a role designated by a given user device 102 may vary over time. Further, such roles may coexist. For at least one embodiment, two or more user devices 102, on a given LAN 118, may be designated as a "master" and/or a "remote". For at least one embodiment, Joeys 103 are not designated as master or remote user devices, and instead fall within their own category of devices that are dependent on a master or a remote user device with receiver, tuner, and other content processing operation capabilities.

For at least one embodiment, the seamless engine 105 may be configured to facilitate a given role of a user device 102 with respect to a given tuner as being associated with a given "session." More specifically and for at least one embodiment, a session is a process, executed by one or more user devices 102, wherein a given content is received from a content source 116. The session may also include one or more content processing operations which convert such content into a final or intermediate form for presentation to a human user (herein, "content processing operations") Non-limiting examples of such content processing operations include demodulation, amplification, decryption, and otherwise.

It is to be appreciated that for at least one embodiment, the seamless engine 105 may be configured to facilitate multiple, simultaneous sessions with respect to multiple content. It is to be appreciated that a tuner is commonly used for each session, but, for one or more embodiments, a single tuner may facilitate multiple sessions.

Further and for at least one embodiment, the seamless engine 105 may be configured to facilitate synchronization between two or more sessions, as desired. For at least one embodiment, a receiving of a given content by a first user device 102(A) may be transferred to another user, second user device 102(B), as desired. Such transfers may be synchronized such that presentation of a given content is minimally interrupted, if at all, as determined from a user's perspective, where a minimal interruption is an interruption in a presentation of a given content for less than two (2) seconds. For another embodiment, such synchronization may not be facilitated by a seamless engine 105

For at least one embodiment, the seamless engine 105 may be configured to facilitate user devices on the LAN 118 being able to utilize tuners of another user device 102 on the LAN 118 to receive and/or perform one or more content processing operations.

For example, a first user device 102(A) may have capability to decrypt a given content stream, while a second user device 102(B) currently provides such desired capability. Accordingly and for at least one embodiment, the first user device 102(A) may utilize, over the LAN 118, the content decryption capabilities of the second user device 102(B) on an as needed, as desired, as permitted, or other basis.

For at least one embodiment, the seamless engine 105 may execute on a user device 102 configured to operate as a hub and spoke which facilitates communications between a first user device 102(A) and one or more second user devices 102(B)-102(N) and/or Joeys 103 over a then arising LAN 118. More specifically, one of the user devices 102 may be configured to operate its seamless engine 105 in the master mode, while other user devices on the LAN 118 may be configured to operate their seamless engine 105 in one of a subordinate mode, such as a remote mode or a Joey mode (for Joeys 103). In other embodiments, each seamless engine 105 may be configured to operate, independently, in a master mode, with any conflicts arising between respective user devices 102 being resolved in view of one or more conflict roles and/or algorithms executed by the seamless engine 105 on each such user device 102.

For at least one embodiment, a seamless engine 105 may be configured to identify available and acceptable user devices 102 and/or Joeys 103 for coupling together on a formed or to be formed LAN 118. Such identification may be based upon relationship information stored in a storage device 112, such as an account identifier, where, for example and not by limitation, each user device 102 and/or Joey 103 configured for use on a given LAN 118 is associated with a household identifier. User devices 102 and/or Joeys 103 not so associated with a given household identifier, such as those provided in another unit of a multi-unit dwelling, may not be configurable for use on a given LAN 118 for a given household. For at least one embodiment, household relationship information may be provided to each user device 102 and/or Joey 103 using any known or later arising communications technologies. For at least one embodiment, one or more smart cards, processes, modules, or the like for the security module 108, in a given user device 102 and/or Joey 103, may be configured to include such household identifier.

For at least one embodiment, a seamless engine 105 may be configured to invite and/or accept other user devices 102 and/or Joeys 103 onto a given LAN 118, for accessing tuners provided by one or more other user devices 102 on the LAN 118 and based upon one or more criteria and/or corresponding settings. One non-limiting example of a criteria may include whether a given user device 102 and/or Joey 103 is permitted to access a tuner to receive content in one or more rating and/or parental control classifications, such as PG-13, R, or otherwise. Another non-limiting example of a criteria may include whether a given user device 102 and/or Joey 103 is permitted to access a receiver within certain time periods, such as late night, or otherwise. Another non-limiting example of a criteria may include whether a given user device 102 and/or Joey 103 is permitted to access tuner in order to access content having a limited use, payment, or other criteria.

For at least one embodiment, the seamless engine 105 may be configured to facilitate control of access to tuners on user devices 102 on a LAN 118 by use of other forms of access criteria such as passcodes, security keys, or other information. For at least one embodiment, a seamless engine 105 may be configured to accept any user device 102 and/or Joey 103 within range thereof and/or satisfying/over-coming one or more access criteria.

For at least one embodiment, the seamless engine 105 may be configured to facilitate formation of multiple seamless tuner sessions between multiple user devices 102 and/or a user device 102 and a Joey 103, on a given LAN 118. For example, a first seamless tuner session may permit access to a tuner on a first user device 102(A) by a user thereof, while a second seamless tuner session may permit access by a second user, via a second user device 102(B) and/or a Joey 103, to a tuner provided by the first user device 102(A).

For at least one embodiment, the seamless engine 105 may be configured to facilitate private, seamless tuner sessions. For a private session, participation in the session may be limited to a selected group of user devices 102 and/or Joeys 103. That is, content provided by use of a given tuner may be multi-cast to one or more user devices 102 and/or Joeys 103. For at least one embodiment, a private session identifier may not be discoverable to other user devices 102 and/or Joeys 103 on the LAN 118 absent knowledge of the same and the providing of one or more credential, passcodes, or the like.

For at least one embodiment, the seamless engine 105 may be configured to facilitate public, seamless tuner sessions. For a public session, participation in the seamless tuner session may be unlimited and any user device 102 and/or Joey 103 having permission to join the LAN 118 may join in the session and receive the content via the designated tuner. For at least one embodiment, permission to join the LAN 118 may not be required. Accordingly, it is to be appreciated that a seamless tuner session may occur at any desired level of openness ranging from private to public and may, in effect, function as a broadcast session.

For at least one embodiment, the seamless engine 105 may be configured to facilitate a seamless tuner session by designating a given user device 102 as a master for providing information available to form the session between two or more user devices 102 and/or with a Joey 103 and for reconfiguring other user devices 102, as needed, to facilitate such other user devices 102 and/or Joeys 103 joining and/or participating in one or more sessions.

For at least one embodiment, the seamless engine 105 may be configured to facilitate seamless tuner session formation and/or reconfiguration, by each user device 102 and Joey 103 configuring itself to periodically output one more "available" signals. The available signals may be used to identify a given user device 102 or Joey 103 as available on a given LAN 118 and as being available to participate in a given seamless tuner session. An available signal may designate a given session, a to be formed session, no session, or otherwise.

The seamless engine 105 may also be configured to facilitate designation of a given user device 102 as being (in)capable to operate, with respect to one or more sessions, in a master mode or a remote mode. For at least one embodiment and as defined herein, Joeys 103 are not configured to operate in a master mode or a remote mode. Such designations may vary over time and as use of a given user device 102 so varies. It is to be appreciated that a given user device 102 may not have the same capabilities as another user device, at any given time, or otherwise. For example, a first user device 102 may be capable of receiving and/or performing one or more content processing operations with respect to 4K video signals while another user device 102 is capable of receiving and/or performing one or more content processing operations with respect to video signals having a resolution only up to 1080p. The seamless engine 105 may be configured to facilitate such designation and, in conjunction with other user devices 102 on a given LAN 118, allocate resources across the LAN 118 to facilitate one or more, if not all, the desired sessions—as subject to any and/or each user device, LAN, and other system constraints.

For at least one embodiment, the seamless engine 105 may be configured to facilitate a given seamless tuner session by recognizing capabilities of other user devices 102 participating in the given session, and/or on a given LAN 118, at a given time and/or at a future time. The seamless engine 105 may be configured to facilitate adaptations to sessions as based upon then arising system 100 capabilities. For example, the entry or exit of one or more user devices 102 and/or Joeys 103 from the LAN 118 may require an adaptation in how sessions are executed, if executable.

DVR Manager (130)

For at least one embodiment, a seamless engine 105 may be configured to execute additional operations facilitating use of a DVR manager 130. The DVR manager 130 may be executed in conjunction with and/or in support of a seamless DVR engine including, but not limited to, those seamless engines taught by Seamless DVR.

Tuner Manager (132)

For at least one embodiment, a seamless engine 105 may be configured to execute operations for facilitating seamless use of tuners—as provided by multiple user devices 102 on a LAN 118. For at least one embodiment, the tuner manager 132 may be configured to perform one or more of the operations described herein including, but not limited to, the operations described herein in conjunction with FIGS. 4-7.

Timer Manger (134)

For at least one embodiment, a seamless engine 105 may be configured to execute additional operations facilitating use of a timer manager 134. The timer manager 134 may be executed in conjunction with and/or in support of a seamless engine including, but not limited to, those seamless engines taught by Seamless Timers.

Storage Module (106)

For at least one embodiment, a user device 102 may include one or more storage module(s) 106. Computer instructions, data sets and/or other information (collectively herein, "stored data") may be stored by such storage module(s) 106 and used by the processor 104 and/or other system hardware and/or software components to provide one or more features and/or capabilities of the various embodiments of the present disclosure. For example, the processor module 104 may be configured to execute, use, implement, modify, or otherwise process such stored data. It is to be appreciated that the storage module(s) 106 (each module and/or sub-division thereof a "storage component") may be configured using any known or later arising data storage technologies. In at least one embodiment, storage module(s) 106 may be configured using flash memory technologies, micro-SD card technology, as a solid-state drive, as a hard drive, as an array of storage devices, or otherwise. Storage module(s) 106 may be configured to have any desired data storage size, read/write speed, redundancy, or otherwise. A storage module 106 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise.

Storage module(s) 106 may include one or more databases providing information, instructions and/or data for use in facilitating seamless tuner sessions, LAN formation and operation, and otherwise. For at least one embodiment, such databases may include one or more of a content database 107, a user database 109, a history database 111, a support database 113, an "other" database 115, a tuner database 117, and a timer database 119. Other databases may be used for other embodiments.

Content Database (107)

For at least one embodiment, a content database 107 may be configured to collect and provide access to content for use during one or more seamless DVR sessions. Content may be group, partitioned, or otherwise associated for use with and/or during a seamless DVR session automatically, based on user input, or otherwise. Non-limiting examples of the content database 107 are further described in Seamless DVRs. As discussed above, a seamless DVR session may be specific to a given content, a given LAN, a given collection of user devices, or otherwise. For example, a seamless DVR session may be formed with respect to all content, where any user device participating in the seamless DVR session may access the content. For another embodiment, the content database may partition and/or identify content permissible to only those user devices meeting certain criteria. For at least one embodiment, the content database may be configured to categorize content based upon genre, rating, or other criteria.

Further, it is to be appreciated that seamless DVR sessions, as related to how content is stored, accessed or otherwise provided by a given user device 102, may be generalized and/or specified (to any level thereof or therebetween) to the extent that such content itself may be generalized and/or specified. For at least one embodiment, a seamless DVR session may be additionally, separately, and/or alternatively specific to a given group of user devices, such as user devices A, B and C. Such grouping of user devices with respect to a given seamless DVR session may, as desired, may be specific to a given LAN or otherwise. The content database 107 facilitates the storage of data related to seamless DVR sessions that the seamless DVR engine 105 may utilize to facilitate formation, use, reconfiguration and/or demolition of a seamless DVR session.

User Database (109)

For at least one embodiment, information pertaining to a user and/or a population of users may be provided by a user database 109. The storage module 106 may be configured to collect and provide data relating to one more users and/or their preferences. The user preferences may include any information that may be and/or is useful in supporting one or more seamless tuner sessions. Non-limiting examples of such user preferences may include types of content a user prefers. The breadth and scope of such types of information, and the degree of specificity and/or anonymity and/or generality associated therewith is not limited and may vary as desired with the providing, use, or otherwise of one or more seamless tuner sessions. Any source of information may be used in populating the user database 109. The user database 109 may be used by the seamless engine 105 of a first user device 102(A) in determining which tuner on a second user device 102(B) is accessible to a user of the first user device 102(A). For example, a user preference of sports related content being presented in 4K and not at lower resolutions, may result in a given seamless engine 105 providing a universal tuner directory 300 tailored to such user preferences by indicating tuners available to support such 4K content preferences.

For at least one embodiment, the user database 109 may be configured to provide information pertaining to capabilities of a given user device. Such capabilities information may include information regarding peripheral devices coupled to the user device 102, such as capabilities of a display device coupled to a given user device 102. Such information may be useful in determining which tuners to use during a given seamless tuner session, in view of capabilities of a destination user device. In view of such capabilities, content that exceeds capabilities of a given user peripheral device may not need to be received or otherwise processed. Such information may be informative in identifying tuners available to meet a user's preference. Likewise, a tuner for use in processing content that is of a lesser quality (such as, standard definition content) from a first source may not be identified for a given session when a tuner supporting content of a higher quality (such as, high definition content) is available from another source. Other considerations may be used by a given user device's seamless engine 105, based upon information stored in the user database 109, in facilitating a seamless tuner session.

History Database (111)

For at least one embodiment, information pertaining to a history of seamless tuner sessions may be provided by a history database 111. The storage module 106 may be configured to collect and provide data relating to the use, construction of and deconstruction, as appropriate, of seamless tuner sessions by a given user device. Such data may be useful in facilitating the creation and/or use of future seamless tuner sessions, generating opportunities to monetize the promotion and/or advertising of content in conjunction with and/or in support or response to the use of seamless tuner sessions, and otherwise. The history database 111, for at least one embodiment, may include information obtained from the user database 109. Information provided by the history database 111 may be provided at any desired level of anonymity.

Support Database (113)

For at least one embodiment, a support database 113 may be configured to collect and provide data relating to one or more functions provided by a given user device 102 for use during a seamless tuner session and/or to facilitate formation, reconfiguration, and/or demolition of a seamless tuner session on one or more LANs 118. The support database 113 may be configured to provide support features, such as tutorials or the like, that provide support for formation of seamless tuner sessions and otherwise. Data provided in such a support database 113 may be used by a seamless engine 105.

Other Databases (115)

For at least one embodiment of the present disclosure, the storage module 106 may include the use, on a transient or non-transient basis, of other databases 115. The stored data in such other databases 115 being provided for execution and/or use, singularly or collectively, by the processor 104 and/or other components of a user device 102. Any type of stored data and associated computer instructions implemented for use of such stored data may be provided by the other databases 115 for use by a seamless engine 105 or otherwise.

Tuner Database (117)

For at least one embodiment, a tuner database 117 may be configured to collect information regarding tuners for use during one or more seamless tuner sessions. Such tuners may be grouped, designated, reserved, or otherwise associated for use with and/or during a seamless tuner session automatically, based on user input, or otherwise. As discussed above, a seamless tuner session may be specific to a given content source, a given LAN, a given collection of user devices, or otherwise. For example, a seamless tuner session may be formed with respect to all multiple content streams accessible using a common tuner and/or one or more common content processing operations. For another embodiment, the tuner database may identify content streams accessible to only certain user devices meeting certain criteria. For at least one embodiment, the tuner database 117 may be configured to categorize tuner use based upon user device, channel, time, user, and otherwise. Examples of such categorization are shown in FIG. 2 where non-limiting examples of STB specific tuner directories are shown.

Timer Database (119)

For at least one embodiment, a timer database 119 may be configured to collect information regarding timers designating one or more future uses of one or more tuners. For at least one embodiment, such timers may designate one or more future arising seamless tuner sessions. Such timers may be grouped, designated, reserved, or otherwise associated for use with and/or during a seamless tuner session automatically, based on user input, or otherwise. Non-limiting examples of a timer database 119 are further described in Seamless Timers.

More specifically, for at least one embodiment, and as shown in FIG. 2, each user device 102 participating in a LAN 118 may include a storage module 106 that includes a tuner database 117 that is populated with a STB specific tuner directory, such as a first tuner directory 202(A), a second tuner directory 202(B) and a third tuner directory 202(C). Each tuner directory identifies current and scheduled future uses of a given tuner provided by a given STB. As discussed above, such STBs having tuners are identified herein as user devices 102.

For at least one embodiment, a STB tuner directory 202 may include a tuner data field 204. The tuner data field identifies each tuner on a given user device 102. For at least one embodiment, a STB tuner directory 202 may include a request type field 206. The request type field identifies a source type of a given content. Such source type may be a modulated signal containing multiple instances of channelized contents, such as provided by broadcast satellite streams, cable streams, or otherwise. For at least one embodiment, the request type field may be used to identify a priority of a given use of a tuner. For example, a tuner designated for use based upon a pre-set auto-tune function may receive a unique designation. Such an auto-tune may arise, for example and not by limitation, during use of a Seamless DVR, Seamless Timer and/or other feature or function. Further, a tuner may be designated for use with other categories of tuner requests, such as Pay-Per-View (PPV) requests, emergency broadcast messaging use, or otherwise. For at least one embodiment, tuner use, reservation and/or allocation may be prioritized based upon, in whole or in part, information contained in a request type field, a priority field, or otherwise. For purposes of the present disclosure only, and not by means of limitation, herein a tuner prioritization scheme may include uses, from a highest to lowest priority, of Emergency Broadcast Messaging (EBM), Auto-Tune, PPV, Original Content (OC), and Reruns (RR). Other tuner prioritization schemes may be used for other embodiments.

For at least one embodiment, a STB tuner directory 202 may include a time field 208. The time field may indicate when a given tuner is reserved for use. Such reservation may be made in conjunction with or separately from use of a Seamless Timer. The time field 208 may be used, for at least one embodiment, to identify currently available tuners, at a given time, and one or more periods during which such given tuner is not reserved or then being used.

For at least one embodiment, a STB tuner directory 202 may include a user field. The user field may be used to designate a user that has requested and/or is currently using a given tuner. For at least one embodiment, tuner requests may be prioritized based upon requesting user. Such prioritization may arise with respect to all user devices 102 and/or to specific user devices 102 via which a given tuner request is received.

As shown in FIG. 2, tuners available across all user devices on a given LAN 118 may be sequentially numbered, with tuners on a designated master user device having a higher designation than tuners on other devices. But, other designators and/or designation schemes may be used for other embodiments of the present disclosure.

In accordance with at least one embodiment, a system 100 may be configured such that tuners provided by a designated master user device are utilized primarily for requests received from users, via a user input device, communicating directly with such master user device. For at least one embodiment, tuners on a designated master user device may be reserved, when not requested by a user directly accessing such master user device, for use with tuner requests received from one or more Joeys 103. For at least one embodiment, tuners provided by remote user devices are used in furtherance of tuner requests received from remote users of such user devices.

As shown in FIGS. 3A and 3B and for at least one embodiment, when a LAN 118 is being formed and/or reconfigured, a universal tuner directory 300 may be populated, based upon tuners identified in each STB tuner directory 202, for each of the user devices 102 participating then on a given LAN 118. As shown in FIGS. 3A and 3B, the universal tuner directory 300 may be populated, at a given time, as shown in FIG. 3A, based upon the participation thereof of each of the first user device 102(A), the second user device 102(B), and the third user device 102(C) on the given LAN 118. As shown in FIG. 3B, the second user device 102(B) is no longer participating on the LAN 118. Such non-participation may arise for any reason, such as the second user device 102(B) being unpowered, due to a use time window expiring, or otherwise.

As shown in FIG. 3A, certain content is allocated to certain tuners based upon then available user devices. For example, tuner 1 (in STB (A)) is reserved for use with an autotune set by user "Susan" and is given the highest priority. Similarly, a PPV event requested by user "Steve" is reserved for use with tuner 4 (in STB (B)), and has been given a second highest priority.

As shown in FIG. 3B, however, when STB (B) is no longer available, a reallocation of tuners may occur, such that the PPV request from Steve is now allocated to tuner 5 (in STB (C)) and the previously fulfilled request by James for a RR is now disregarded. For at least one embodiment, the seamless engine 105 is configured to perform such tuner allocations/deallocations, as based upon tuner request prioritization in view of user devices then available and expecting to be available on a given LAN 118.

For at least one embodiment, the seamless engine 105 executing in each user device 102 may populate their own instance of the universal tuner directory 300. For another embodiment, the universal tuner directory 300 may be populated by a user device 102 operating as a master for a given session and then communicated to each other user device 102 and/or Joey 103 participating on the LAN 118.

As shown in FIGS. 3A and 3B, the universal tuner directory 300 may include the source 204, DRM key 206, title 208, and user identifiers 210 (and any other desired identifiers). The universal tuner directory 300 may also be configured to include, for at least one embodiment, a STB data field 302 identifying the user device providing a given tuner, as identified in a tuner field 304. For at least one embodiment, the seamless engine 105 populating a given universal tuner directory 300 may be configured to include a time field 306. The time field 306 may provide an indication of when one or more tuners are reserved for use.

For at least one embodiment, the seamless engine 105 populating a given universal tuner directory 300 may be configured to include a request field 308. The request field 308 may identify a category of a tuner use/request, such as emergency, autotune, PPV, OC, or RR request. The universal tuner directory 300 may be configured to include a user field 310, identifying a user requesting/scheduling use of a given tuner, and a priority field 312, indicating a then arising priority of a given tuner request.

For at least one embodiment, when a user device 102 is added or deleted from a LAN 118a discovery process for content available across all user devices on the LAN 118 may be initiated. Such discovery process may be facilitated by each user device 102 reporting to other user devices 102 on the LAN 118 the status and any scheduled uses of one or more tuners provided on a given user device. Such status information may be used in populating the universal tuner directory 300.

For at least one embodiment, a universal tuner directory 300 may be updated on a periodic or other basis. For example, every fifteen minutes, each user device 102 on a given LAN 118 may communicate an identifier of tuner status, tuner requests received, tuner requests to be fulfilled, tuner requests unfulfilled, tuner requests dropped, and otherwise to each other user device 102 on that given LAN 118. Such identifier may include a minimum amount of information necessary to uniquely identify a status and future status, to the extent such future status is knowable, on a universal tuner directory 300.

For at least one embodiment, a universal tuner directory 300 data field may also be dynamically populated and/or updated while a user input device, such as a cursor hovers or otherwise selects or indicates interest in a given tuner. Thus, a tuner status, priority thereof, user requesting, and the like may dynamically change based upon use thereof by one or more user devices on a given LAN 118 and user interest therein, with respect to a given user device 102. Such status indicators may also be populated with respect to other content processing operations and components configurable for use therewith.

Security Module (108)

For at least one embodiment, a user device 102 and/or Joey 103 may separately or using computer instructions executed by the processor module 104 provide a security module 108. The security module 108 provides a user device with capabilities of securing user participation on a LAN 118 and with respect to one or more sessions. The security module 108 may be configured to address security needs, including but not limited to, securing the identity of user devices 102 and/or Joeys 103, securing content communicated via a given LAN 118 and for a given session, and other security needs. The security module 108 may operate separately and/or in conjunction with security components provided by other components of a user device 102, Joey 103, and/or the system 100 including those provided by servers 122, content sources 116, and otherwise. Any desired known or later arising security technologies, protocols, approaches, schemes, or otherwise may be used in one or more embodiments of the present disclosure by the security module 108.

For at least one embodiment, the security module 108 on one or more, if not each, user device 102 and Joey 103 participating on a given LAN 118 may be configured to utilize a common household DRM key. Such common household key may facilitate access to content stored, in encrypted form, on each of the user devices participating on the given LAN 118. For other embodiments, a unique DRM key may be required to access unique content. For at least one embodiment, the security module 108 on each user device 102 and Joey 103 participating on a given LAN 118 may be configured to utilize other security keys, inter-device keys, for securing communications over the LAN 118. Such inter-device keys, may be based on any desired information, such as a customer billing number, a customer identifier, and/or other information, may be randomly generated, or otherwise. For at least one embodiment, as user devices join and/or leave a given LAN 118, one or more security keys may be dynamically adjusted, modified, or otherwise processed.

I/O Module(s) (110)

For at least one embodiment, user devices 102 and Joeys 103 may include one or more input/output ("I/O") module(s) 110. Such modules may include audio, visual, text, and/or gesture I/O module.

Audio I/O Module: Audio I/O modules may be configured to support the providing of audible signals between a user and a user device. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and software (herein, "audio technologies") which supports the input and (as desired) output of audible signals to a user. Such audible signals may include those arising from a given content. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHT-SCRIPT, GOOGLE ASSISTANT, SIRI, and others.

In at least one embodiment, an audio I/O module may be configured to use one or more microphones and speakers to capture and present audible information to a user. Such one or more microphones and speakers may be provided by a given user device 102 and/or Joey 103 itself or by a device communicatively coupled additional audible device component, for example, by earbuds may be communicatively coupled to a smartphone, with the earbuds functioning as an audio I/O module and capturing and presenting audio sounds to and from a user, while the smartphone functions as a user device 102 and/or Joey 103. Accordingly, it is to be appreciated that any existing or future arising audio I/O devices, systems and/or components may be utilized by and/or in conjunction with a user device 102 and/or Joey 103 to facilitate one or more embodiments of the present disclosure.

Visual I/O Module: For at least one embodiment, user devices 102 and Joeys 103 may include a visual I/O module configured to support the providing of visible signals between a user and a user device 102 or Joey 103. Such visible signals may be in any desired form, such as still images, motion images, augmented reality images, virtual reality images and otherwise. Such visible information may include one or more of humanly perceptible visible signals. For at least one embodiment, a visual I/O module may also be configured to capture non-humanly visible images, such as those arising in the X-ray, ultra-violet, infra-red or other spectrum ranges. Such non-humanly visible images may be converted, as desired, into humanly visibly perceptible images by a user device.

For at least one embodiment, a visual I/O module generally includes hardware and software (herein, "visible technologies") which supports the input by and (as desired) output of visible signals to a user. Such visible signals may include those arising from a given content. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O module may be configured to use one or more display devices configured to present visible information to user. A visual I/O module may be configured to use one or more image capture devices, such as those provided by lenses, digital image capture and processing software and the like which may be provided by a given user device 102 or Joey 103 itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device 102 or Joey 103 to facilitate one or more embodiments of the present disclosure.

Text I/O Module: For at least one embodiment, user devices 102 and Joeys 103 may include a text I/O module configured to support the providing of textual information by a user using a user device 102 or Joey 103. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language. A text I/O module generally includes hardware and software (herein, "textual technologies") which supports the input by and (as desired) output of textual information signals to a user. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with one or more embodiments of the present disclosure.

Gesture I/O Module: For at least one embodiment, user devices 102 and Joeys 103 may include a gesture I/O module configured to support the providing of gesture information, such as sign language, by a user using a user device 102 or Joey 103. Such gesture information signals may be in any desired form or format. Such gesture information may include one or more of humanly perceptible characters, such as those provided by sign language. For at least one embodiment, a gesture I/O module may also be configured to capture a user's motions to control one or more aspects of a user device 102 or Joey 103; non-limiting examples of such motions including those commonly used on smartphone touch interfaces. A gesture I/O module generally includes hardware and software (herein, "gesture technologies") which supports the input by and (as desired) output of gesture information signals to a user. Such gesture technologies may include technologies for inputting, outputting, and converting gesture content into any given form, such as into textual information, audible information, visual information, device instructions or otherwise. In at least one embodiment, a gesture I/O module may be configured to use an input device, such as a motion detecting camera, touch pad, mouse, motion sensors, or other devices configured to capture motion information. It is to be appreciated that any existing or future arising gesture I/O devices, systems and/or components may be utilized by and/or in conjunction with a user device 102 or Joey 103 to facilitate the use of gesture information in furtherance of one or more seamless DVR sessions.

Interface Module (112)

As further shown in FIG. 1 and for at least one embodiment of the present disclosure, user devices 102 and Joeys 103 may include an interface module 112. The interface module 112 may include one or more components for use in forming a LAN 118 and facilitating one or more sessions. The interface module 112 may use any known or later arising technologies; non-limiting examples including hardware and software configured for use with one or more of the BLUETOOH™, ZIGBEE™, Near Field Communications, Narrowband IOT, WIFI™, 3G, 4G, 5G, cellular, and other currently arising and/or future arising communications technologies. Any known or later arising networking and/or other communications technologies may be used to facilitate communications between user devices 102 and/or Joeys 103 over a LAN 118. For at least one embodiment, communications technologies for a given internal link 124 between a given user device 102, Joey 103, and a LAN 118 may vary by each link used. The interface 112, in conjunction with the seamless engine 105 may be configured to adapt to link types used based upon seamless tuner session then in use, and otherwise.

For at least one embodiment, the interface module 112 may be configured to include one or more data ports for establishing connections between a user device 102 and/or Joey 103 with a LAN 118. Such data ports may support any known or later arising technologies, such as USB 2.0™, USB 3.0™, ETHERNET™, FIREWIRE™, HDMI™, wireless technologies, and others. The interface module 112 may be configured to support the transfer of data formatted using any desired protocol and at any desired data rates/speeds between user devices 102 and Joeys 103 over the LAN 118. The interface module 112 may be connected to one or more antennas (not shown) to facilitate wireless data transfers. Such antenna may support short-range technologies, such as 802.11a/c/g/n and others, and/or long-range technologies, such as 4G, 5G, and others.

Receiver Module (112)

For at least one embodiment, a user device 102 may include a receiver module 112 configured to request and/or receive content from one or more content sources 116. Receiver modules 112 include tuner and other content processing components. Receiver modules 112, tuners and other content processing components are well known in the art and are not further described herein.

Figure 4:
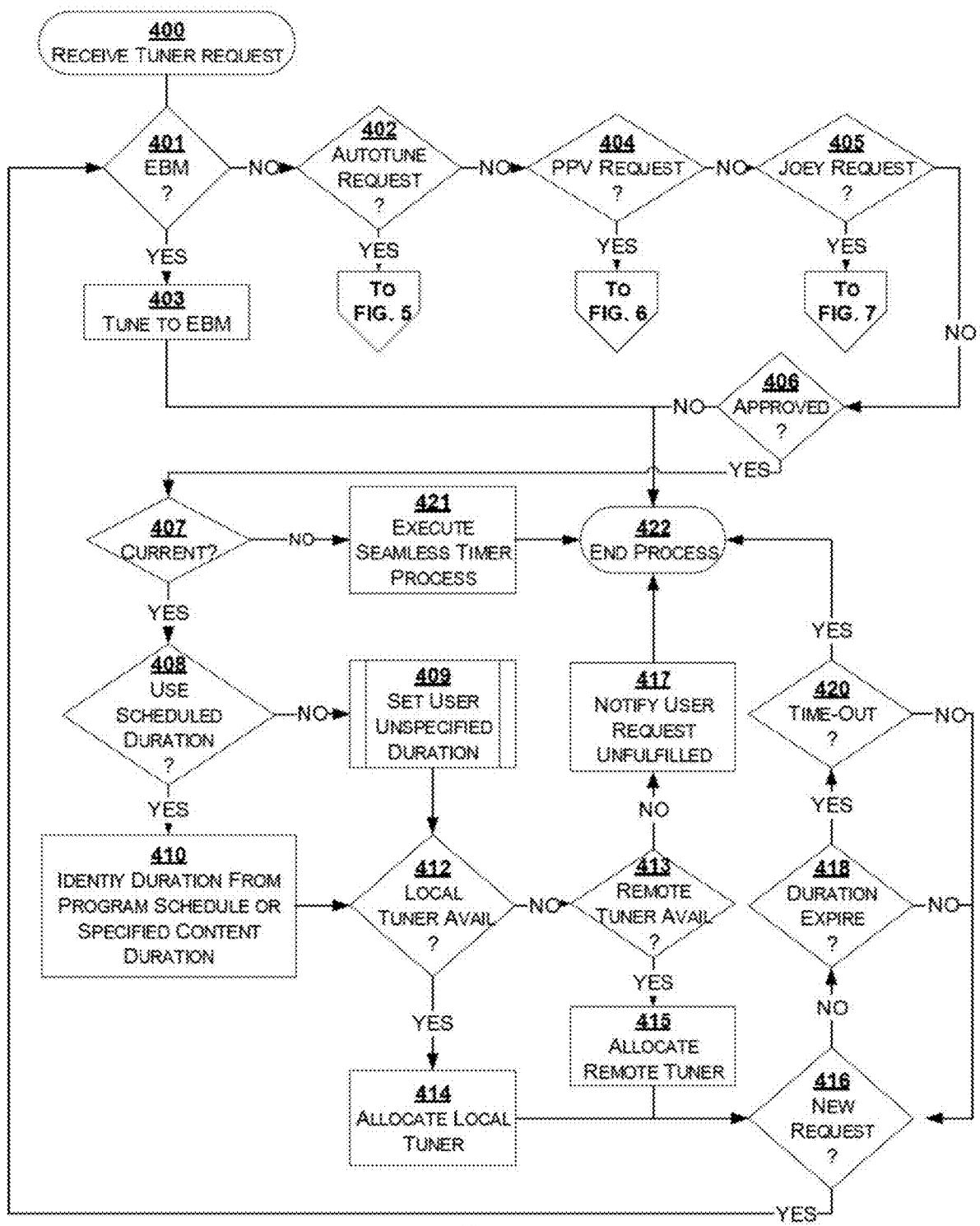
FIG. 4 is a flowchart illustrating a process for facilitating seamless use of tuners and in accordance with use at least one embodiment of the present disclosure to facilitate seamless use of tuners across multiple devices within a local area network.

In FIG. 4 and for at least one embodiment of the present disclosure, a process for facilitating seamless use of tuners across multiple devices within a LAN is shown.

Per Operation 400, the process may begin with a user device 102 receiving a request to access a tuner. Such a request may occur under numerous conditions.

For example and not by limitation, a user device 102 may be configured to automatically activate upon receipt of an EBM, as shown by Operations 401 and 403. For another example and not by limitation, a user device 102 may be requested to auto-tune to a previously set channel, as shown by Operation 402, and as further described below with reference to FIG. 5. For example and not by limitation, a user device 102 may be requested to tune to a given PPV stream, as shown by Operation 404 and as further described below with reference to FIG. 6. For another example and not by limitation, a user device 102 may be requested to tune to a given channel under other conditions. Such process, for at least one embodiment, is further described with reference to FIG. 4. It is to be appreciated that a request to access and EBM, autotune, or PPV may be received by any user device 102 connected to the given LAN 118. Requests from Joeys are treated differently herein and with respect to at least one embodiment since a Joey, as defined herein, does not itself possess any local tuners and instead relies on tuners provided by one or more user devices 102 connected on a given LAN 118.

It is also to be appreciated that content provided by a given tuner may be shared, substantially simultaneously, with multiple user devices 102 and/or Joeys 103 on a given LAN 118. Accordingly, embodiments of the present disclosure may be configured to execute one or more operations of FIGS. 4-7 when a given request by a user of a first user device and/or Joey to change a then shared content stream will effect a viewing of such shared content stream by another user, using a second user device and/or Joey. It is to be appreciated that infinite scenario permutations may arise and decision processes associated therewith for determining which users, as associated with a user device and/or Joey, tuners, and/or other content processing components, are to be allocated, at any given time, to the providing of content to one or more user devices and/or Joeys. Such rules may be tailored, as desired, such as by a homeowner, by a default setting, or otherwise.

Further, it is to be appreciated that an allocation of a tuner and/or other content processing component, in response to a tuner request may also trigger other processes in user devices and/or Joeys. Such other processes may include, for example and not by limitation, scheduling conflict resolution processes, as may arise when a current tuner reallocation results in a rescheduling of a given content to a later arising time. Other processes may include notification processes, whereby a user device and/or Joey is configured to notify a user of a tuner reallocation that will impact a current viewing of a given content.

Further, other processes may include processes unique to two or more user devices/Joeys desiring to watch a common channel. It is to be appreciated that one of such two or more users may desire to use trick play modes of operation, such as pause, fast forward, rewind, and the like. Accordingly, a use of a common tuner to provide the content to two or more set top boxes may result in disparate interests and approaches to the viewing of such content. For example, user A may desire to watch the content live, while user B desires to pause while getting popcorn. Accordingly, the various embodiments of the present disclosure may be configured to address such disparate tuner use scenarios as being unique tuner requests. Such unique tuner requests may be resolved by any desired process including, but not limited to, the processes FIGS. 4-7. For example, when multiple tuners are available, disparate viewing characteristics may be addressed by allocating a tuner to each user device/Joey desirous of receiving the given content. Further, it is to be appreciated that information provided in the various databases may be used in facilitating such tuner allocations. For example, information in the user database and history database may be used in anticipating viewing behaviors for one or more of such users. Such viewing behaviors may inform the seamless engine 105 as to an optimum approach for tuner allocation.

Further, various processes of the current disclosure may also be configured to attend to tuner allocation of live programming versus recorded programming in different manners. For live programming, one or more content processing components, such as data buffers, may also be allocated. Such allocated buffers may be used to buffer a given quantity of content, while such content is received from a content source 116. Such buffering may be allocated based upon time, for example, such that a given quantity of content, as measured in time, is buffered prior to other content processing operations occurring. Yet, when multiple user devices/Joeys are seeking to access such buffered content, synchronization of such devices can be critical. Accordingly, various processes of the present disclosure may include use of synchronization protocols. Such synchronization protocols may be performed by one or more interface modules 112 and/or receiver modules 114. For at least one embodiment, each user device 102 and Joey 103 on a given LAN 114 may have internal clocks that are time synchronized with a master clock. For at least one embodiment, such master clock may be provided by a designated master user device 102. For at least one embodiment, a designated master user device 102 may be configured to synchronize with an uplink center clock, an Internet server clock, a cable head-end clock, a GPS clock, or using another externally provided clocking signal (herein, each a "timing source").

For at least one embodiment, remote user devices and Joeys may be configured to facilitate synchronization with a master user device by use of one or more program clock recovery passing (PCRP) processes. A PCRP may be executed by a seamless engine 105 on each remote user device and Joey and facilitates a slowing, maintaining, and/or acceleration of a local clock, on such remote user device/Joey, in order to be in synchronization with a master clock signal, provided by a master user device. Well-known PINGs, and the like, may be used to determine network latency. Remote user device/Joey processing latency may also be used by the PCRP to adjust remote user device/Joey clocks such that synchronization with a master user device clock can be maintained.

For another embodiment, synchronization may occur by and between each user device, remote or otherwise, and a timing source. For at least one embodiment, Joey synchronization may arise with respect to a designated master user device.

Referring again to FIG. 4, the process may include, per Operation 406, a determination of whether a tuner, or other content processing component, request is approved. Such approval may be based upon one or more channel authorizations, tuner authorizations, or otherwise. For at least one embodiment, approvals may occur at various other times during a tuner allocation process. For at least one embodiment, tuner (and/or other content processing component) authorizations may be made by the user device 102 providing the tuner and/or other content processing component. Such approval processes are illustrated herein, only with respect to Operation 406, but, may arise at any process step for any process and is not to be considered as being limited to the shown FIG. 4 process. For at least one embodiment, approvals of auto-tune events, PPV events, and the like may be limited to a requesting user device. For example, a PPV event requested and approved for presentation using a first user device 102(A) may not be approved for presentation using a second user device 102(B). In other embodiments, approvals may apply to any given or collection of user devices 102 and/or Joeys 103 then connected on a given LAN 118. For at least one embodiment, certain approvals may be provided on a user device basis, yet, user use rules, such as those provided by a content source, may permit viewing of a given content, such as a PPV movie, on any user device 102 and/or Joey 103 on a given LAN 118. Under such a scenario, security modules 108 on each user device 102 and/or Joey 103 may be configured such that a given PPV authorization is device specific. Thus, multiple PPV authorizations may be needed. Under such a scenario, it is to be appreciated that an identification of each of the separately authorized user devices 102 and/or Joey 103 as being on a given LAN 118 may be provided to the content source 116 for the PPV content and reconciliation of any otherwise duplicate billings may be accomplished at the content source 116 and/or other servers 122.

As shown in FIG. 4 for at least one embodiment, when an approval is denied, the process may end, per Operation 422. When the approval is approved, the process may proceed to Operation 407.

Per Operation 407, the process may include a determination of whether a given tuner request is for a current request or a future arising request. When the request is future arising, one or more operations may be performed to determine whether a timer is available. For at least one embodiment, such one or more operations may include one or more Seamless Timer processes, as per Operation 421. When a current request is determined, the process may proceed to Operation 408.

Per Operation 408, the process may include an inquiry as to whether a request is for a scheduled duration or an unlimited duration. For example, a requested presentation of a given episode of a content, where such episode is associated with a predetermined start and end time, may occur by use of a program guide or otherwise. Alternatively, a request to tune to a channel may occur for any specified or unspecified duration, as may occur with channel up/down request, an input of a channel number, or the like. It is to be appreciated that when content of a schedule duration is selected, an expectation may occur that the user so requesting desires to use a tuner for the entirety of the scheduled content. Accordingly, the process may proceed to Operation 410 and specified duration for the content (and associated therewith tuner and/or other content processing component need) identified. However, when an unspecified duration request is received, one or more additional processes may need to be set, such as future arising conflict checks, and the like. Accordingly, the process may proceed to Operation 409 with a specification of a user requested duration, which may include an indefinite designation. Each of Operations 409 and 401 then may proceed to Operation 412.

Per Operation 412, the process may include determining whether a "local" tuner is available to satisfy the request. As used herein, a "local" tuner corresponds to a user device 102 at which the request is first received from the user, for example, by use of a user input device. If a local tuner is available, the process may proceed to Operation 414. If a local tuner is not available, the process may proceed to Operation 413.

Per Operation 413, when a local tuner is not available, the process may include determining whether another tuner, provided by another user device 102 on the given LAN 118 is available. Such determination may involve execution of one or more approval processes, as discussed above. If a remote tuner is not available, the process may proceed to Operation 417—notification to the user that the request cannot be fulfilled—and to an ending of the process, per Operation 422. It is to be appreciated, however, that for other embodiments, other processes may be provided when a request for a tuner (or other content processing component) cannot be locally and/or remotely fulfilled. One or more conflict resolution processes may be executed, by which an existing current or planned tuner use is usurped, in whole or in part, in favor of a presently arising tuner request. Such tuner conflict resolution processes are well known and are not further discussed herein.

Per Operations 414 and 415, when available, a local tuner and/or a remote tuner may be allocated to fulfill the tuner request. Once allocated, the process may proceed with the desired content, corresponding to the requested tuner, being provided to the requesting user device. Such process may continue until a time-out occurs, a power-off occurs, a new request is received, as per Operation 416, or otherwise. As discussed above, it is to be appreciated that a new request may be received with a channel change command, or otherwise. When a new request is received, the process may return to Operation 401. When a new request is not received, the process may proceed to Operation 418—a determination of whether a given duration, when one is known and/or knowable, has expired for a given tuner request. If "no", the process may repeat Operations 416 and 418 until a time-out event occurs, as per Operation 420, at which event the process ends, as per Operation 422.

Figure 5:
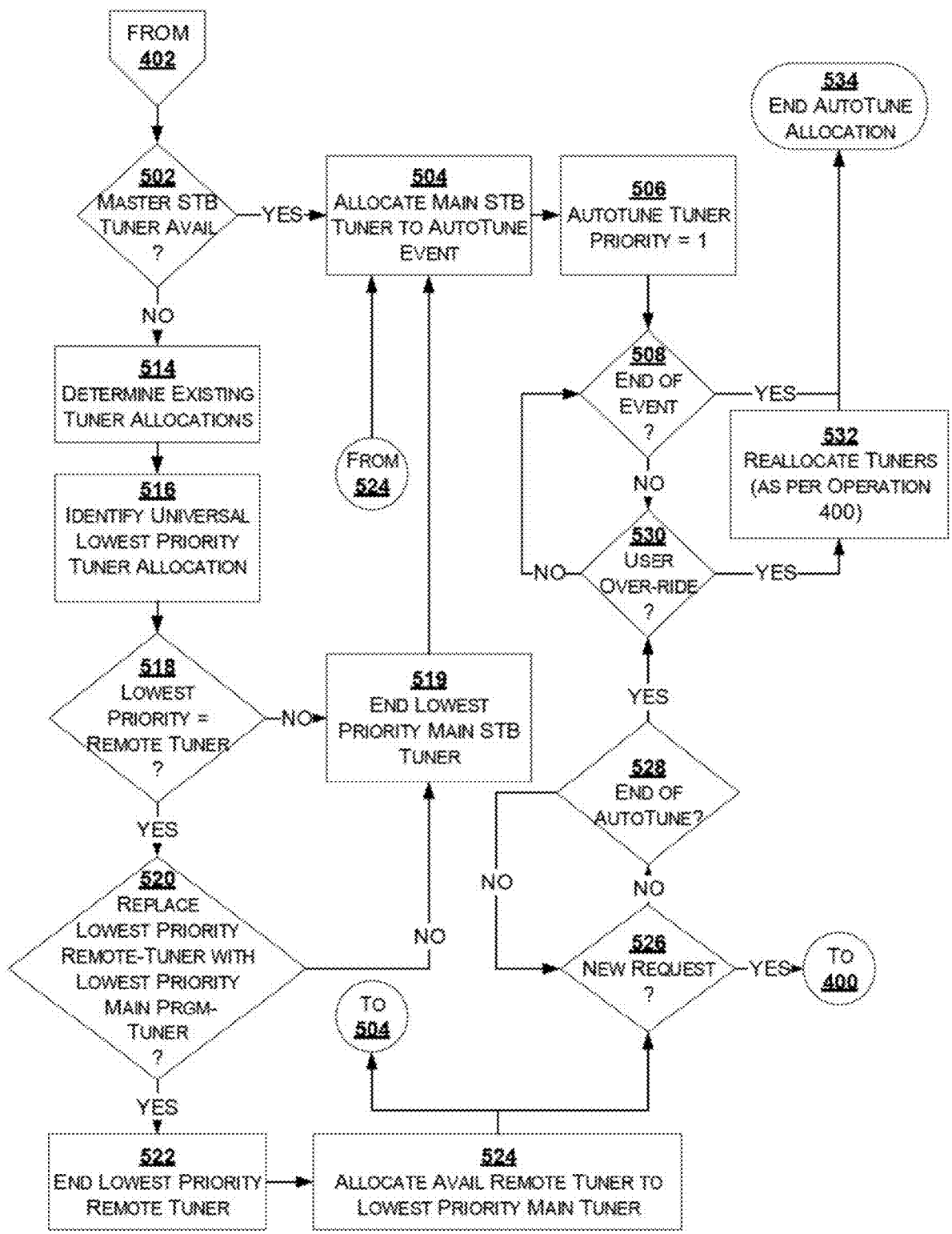
FIG. 5 is a flowchart illustrating a process for facilitating seamless use of tuners, for autotune requests, and in accordance with use at least one embodiment of the present disclosure to facilitate seamless use of tuners across multiple devices within a local area network.

Referring again to FIG. 4, Operation 402, when an auto-tune event is received, the process may include one or more operations shown in FIG. 5.

Per Operation 502, the process may include determining whether a master STB tuner is available. It is to be appreciated that for at least one embodiments, a system 100 may be configured such that auto-tune events are processed first, when possible, by a master STB/user device 102, such as a DISH HOPPER. For at least one embodiment, the master STB/user device 102 may be configured to include tuners and/or other content processing components best configured for use with auto-tune content—content that a given user has indicated is of particular interest thereto. If a master STB tuner is available, the process may proceed to Operation 504. If not, the process may proceed to Operation 514.

Per Operation 504, when a master STB tuner is available for the auto-tune event, a tuner may be allocated by the master STB to autotune to the desired event. As used herein, an "event" refers to a selection of a given content, from an identified content source, for a given duration. The process may further include Operation 506.

Per Operation 506, the process may include designating the auto-tune event with a priority indicators, such as a priority "1"—indicating a highest priority. A priority indicator may be used by conflict resolution procedures to enable a user device to automatically resolve tuner request conflicts. It is to be appreciated that one or more auto-tune events may simultaneously each have the same priority. When such a situation occurs and a tuner (or other content processing component) shortage arises, other information may be used in resolving such conflicts. Such other information may be provided, for at least one embodiment, by one or more of the content database 107, user database 109, history database 111, or otherwise.

Per Operation 508, the process may include allocating the given tuner to the auto-tune event until a pre-determined, determined and/or manually inputted end to the event occurs. If so, the process may end the autotune allocation, as per Operation 534. If the event end has not been reached, the process may include awaiting a user over-ride action, as per Operation 530. For example, an autotune event may tune to a previously broadcast (or otherwise provided) version of a given content episode. Upon tuning to such event, a user may realize, at any time, that they have already seen the episode and thus executes a channel change operation. When such a channel change occurs, the user's actions may trigger a new tuner request and the process may resume at Operation 400.

Referring again to Operation 502, when a tuner is not available on the master STB/user device, the process may proceed to Operation 514.

Per Operation 514, the process may include determining existing tuner allocations. Such determination may be made by querying each user device then on a given LAN, referring to a universal tuner directory, or otherwise.

Per Operation 516, the process may include identifying the lowest priority tuner allocation. It is to be appreciated that such determination may be made in view of the type of event (e.g., a 4K content event versus a 1080P content event), future occurring tuner reservations, and other considerations. Such lowest priority tuner may arise on master STB and/or a remote STB.

Per Operation 518, the process may include determining if the lower priority tuner is a remote tuner, i.e., a tuner provided by a remote user device/STB. If "no," the process may proceed to Operation 519. If "yes," the process may proceed to Operation 520.

Per Operation 519, when the lowest priority tuner is not provided by a remote tuner, by default, it is assumed to arise on the main/master STB. Accordingly, the lowest priority tuner is ended/cancelled and the process proceeds to Operation 504.

Per Operation 520, when the lowest priority tuner is provided by a remote tuner, the process may include replacing the lowest priority remote tuner with the lowest priority tuner provided by the main/master STB. It is to be appreciated, that such a process approach may be used to satisfy a preference to have auto-tune tuners executed on the main/master STB. When such a preference does not exist, the process may include replacing the lowest priority remote tuner with the new auto-tune request.

Per Operation 522, the process may also include ending the lowest priority remote tuner. It is to be appreciated that Operation 522 may occur simultaneously with Operation 520 when an immediate need to tune to the auto-tune event exists. However, when an auto-tune event arises in a near future, for example, within a next fifteen (15) minutes or less, an immediate need to terminate the lowest priority remote tuner may not exist. Accordingly, Operation 522 may be delayed until a start time for, or a designated time before, the auto-tune event occurs.

Per Operation 524, the process may include allocating the lowest priority remote tuner to the lowest priority main/master tuner. It is to be appreciated that allocation of the lowest priority main/master tuner to the lowest priority remote tuner effectively shifts a then arising low, if not lowest, priority program to a remote STB and frees the main/master STB for use in receiving and processing higher priority content, such as content for an auto-tune event. As shown, the process may then proceed in parallel with Operation 504, by which the auto-tune event is received, etc. and with Operation 526.

Per Operations 526 and 528, the process may include awaiting detection of any new tuner requests until the autotune event ends. If any such new requests are received, the process may proceed with Operation 400. When the autotune event ends, for at least one embodiment, a process for reallocating tuners may occur. Such process may be subject to user over-rides, as per Operation 530. User over-rides may occur based upon inputs received from a user via the I/O module 110. If no user over-rides are received, then tuners may be reallocated, as based upon received tuner requests, and end as per Operations 532 and 534.

Figure 6:
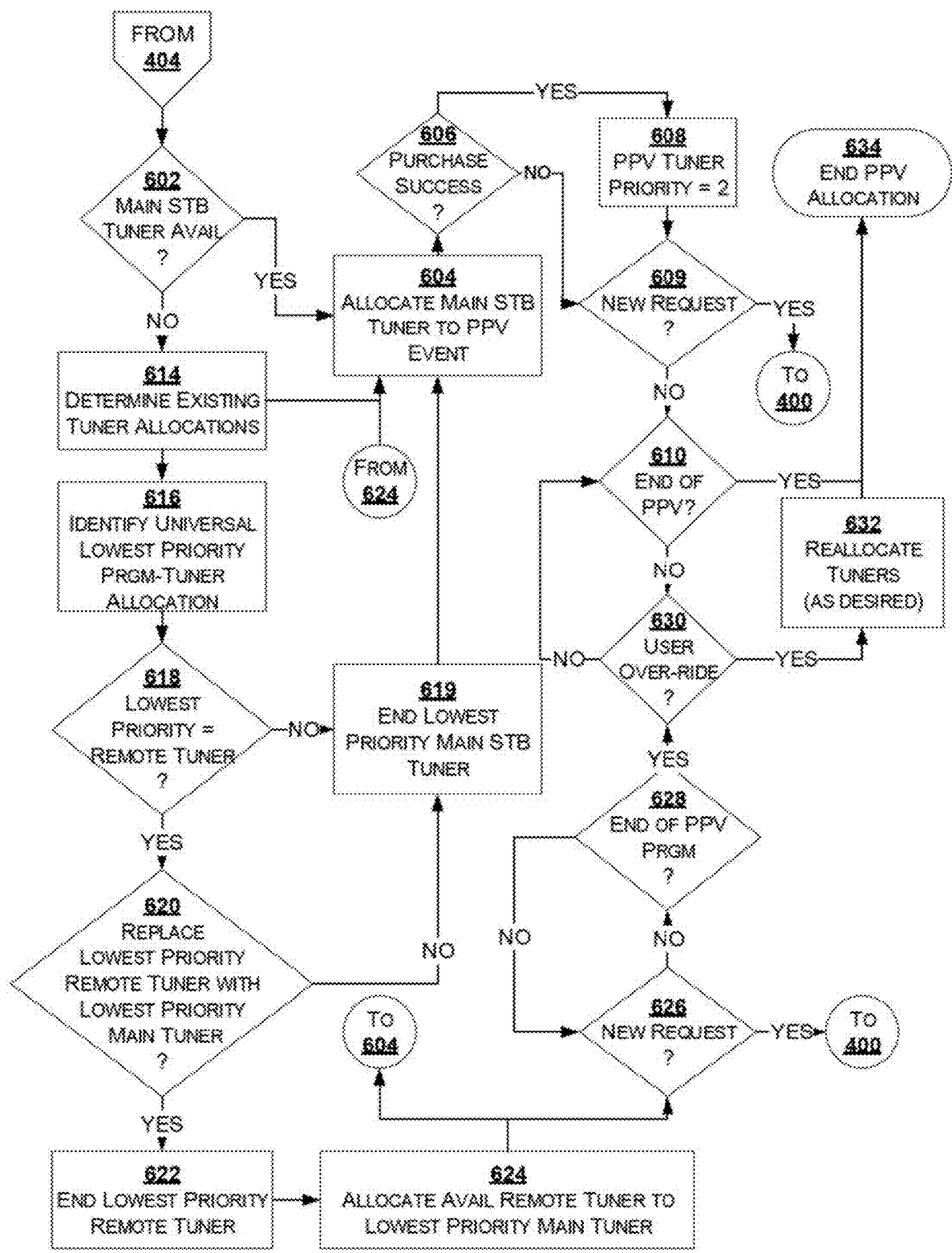
FIG. 6 is a flowchart illustrating a process for facilitating seamless use of tuners, for pay-per-view (PPV) requests, and in accordance with use at least one embodiment of the present disclosure to facilitate seamless use of tuners across multiple devices within a local area network.

Referring again to FIG. 4, Operation 404, when a PPV event is received, the process may include one or more operations shown in FIG. 6.

Per Operation 602, the process may include determining whether a main/master STB tuner is available. It is to be appreciated that for at least one embodiments, a system 100 may be configured such that PPV events are processed, when possible, by a master STB/user device 102, such as a DISH HOPPER. For at least one embodiment, the master STB/user device 102 may be configured to include tuners and/or other content processing components best configured for use with PPV content—content that a given user has indicated is of particular interest thereto. If a main/master STB tuner is available, the process may proceed to Operation 604. If not, the process may proceed to Operation 614.

Per Operation 604, when a main/master STB tuner is available for the PPV event, a tuner may be allocated by the main/master STB to tune to the desired PPV event. The process may further include Operation 606.

Per Operation 606, the process may include determining whether the PPV event has then, or previously been purchased. It is to be appreciated that such an operation is a form of an approval operation which, as discussed above, may occur at any time during any of the processes of the present embodiment. If the PPV event has been purchased, the process may proceed to Operation 608, as discussed further below. If the PPV event has not been purchased, the process may proceed to Operation 609 during which a determination may be made as to whether a new tuner request has been received, if so the process may proceed to Operation 400, or if PPV event has ended, per Operation 610, as discussed further below.

Per Operation 608, the process may include designating the PPV event with a priority indicators, such as a priority "2"—indicating a second highest priority. A priority indicator may be used by conflict resolution procedures to enable a user device to automatically resolve tuner request conflicts. It is to be appreciated that one or more PPV events may simultaneously each have the same priority. When such a situation occurs and a tuner (or other content processing component) shortage arises, other information may be used in resolving such conflicts. Such other information may be provided, for at least one embodiment, by one or more of the content database 107, user database 109, history database 111, or otherwise.

Per Operation 610, the process may include allocating the given tuner to the PPV event until a pre-determined, determined and/or manually inputted end to the event occurs. If so, the process may end the PPV allocation, as per Operations 632 and 634. If the event end has not been reached, the process may include awaiting a user over-ride action, as per Operation 630.

Referring again to Operation 602, when a main/master tuner is not available for the PPV event, the process may proceed to Operation 614.

Per Operation 614, the process may include determining existing tuner allocations. Such determination may be made by querying each user device then on a given LAN, referring to a universal tuner directory, or otherwise.

Per Operation 616, the process may include identifying the lowest priority tuner allocation. It is to be appreciated that such determination may be made in view of the type of event (e.g., a 4K content event versus a 1080P content event), future occurring tuner reservations, and other considerations. Such lowest priority tuner may arise on a master STB and/or a remote STB.

Per Operation 618, the process may include determining if the lower priority tuner is a remote tuner, i.e., a tuner provided by a remote user device/STB. If "no," the process may proceed to Operation 619. If "yes," the process may proceed to Operation 620.

Per Operation 619, when the lowest priority tuner is not provided by a remote tuner, by default, it is assumed to arise on the main/master STB. Accordingly, the lowest priority tuner is ended/cancelled and the process proceeds to Operation 604.

Per Operation 620, when the lowest priority tuner is provided by a remote tuner, the process may include replacing the lowest priority remote tuner with the lowest priority tuner provided by the main/master STB. It is to be appreciated, that such a process approach may be used to satisfy a preference to have PPV tuners executed on the main/master STB. When such a preference does not exist, the process may include replacing the lowest priority remote tuner with the new PPV request.

Per Operation 622, the process may also include ending the lowest priority remote tuner. It is to be appreciated that Operation 622 may occur simultaneously with Operation 620 when an immediate need to tune to the auto-tune event exists. However, when a PPV event arises in a near future, for example, within a next fifteen (15) minutes or less, an immediate need to terminate the lowest priority remote tuner may not exist. Accordingly, Operation 522 may be delayed until a start time for, or designated time before, the PPV event occurs.

Per Operation 624, the process may include allocating the lowest priority remote tuner to the lowest priority main/master tuner. It is to be appreciated that allocation of the lowest priority main/master tuner to the lowest priority remote tuner effectively shifts a then arising low, if not lowest, priority program to a remote STB and frees the main/master STB for use in receiving and processing higher priority content, such as content for a PPV event. As shown, the process may then proceed in parallel with Operation 604, by which the PPV event is received and processed and with Operation 626.

Per Operations 626 and 628, the process may include awaiting detection of any new tuner requests until the PPV event ends. If any such new requests are received, the process may proceed with Operation 400. When the PPV event ends, for at least one embodiment, a process for reallocating tuners may occur. Such process may be subject to user over-rides, as per Operation 630. User over-rides may occur based upon inputs received from a user via the I/O module 110. If no user over-rides are received, then tuners may be reallocated, as based upon received tuner requests, as per Operations 632 and 634.

Figure 7:
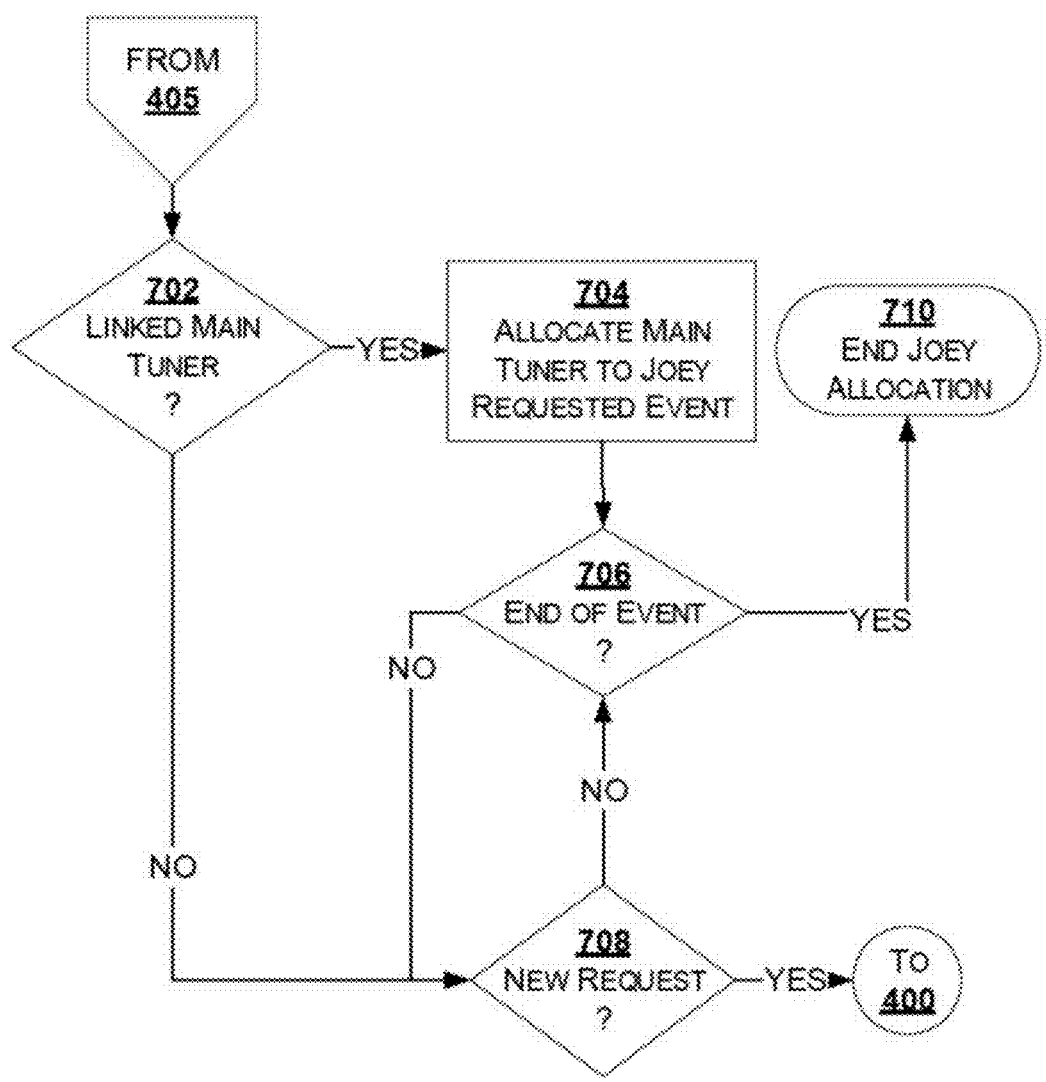
FIG. 7 is a flowchart illustrating a process for facilitating seamless use of tuners, for tuner requests received by client devices (herein, each a "Joey"), and in accordance with use at least one embodiment of the present disclosure to facilitate seamless use of tuners across multiple devices within a local area network.

Referring again to FIG. 4, Operation 404, when a tuner request from a Joey 103 is received, the process may include one or more operations shown in FIG. 7.

Per Operation 702, the process may include determining whether a main tuner, provided by a user device 102, is linked to the Joey 103. A linked main tuner indicates that a tuner on a user device 102 is dedicated for use with the Joey 103. If a tuner is linked, the process may proceed to Operation 704. If not, the process may proceed to Operation 714.

Per Operation 704, when a main/master STB tuner on a user device 102 is linked to the requesting Joey 103, the linked tuner may be allocated by the main/master STB to tune to the desired event.

Per Operation 706, the allocation may occur until the event ends or per Operation 708 a new request is received, at which instance the process may proceed to Operation 400.

It is to be appreciated, that a shown per FIG. 7 and for at least one embodiment of the present disclosure, Joeys 103 are dependent on a linked main tuner on a user device 102. When such linkage does not exist, the Joey 103 is rendered unusable. For other embodiments, a Joey 103 may be configured for use with a remote and non-linked main STB. Under such a scenario, one or more of Operations 407 to 422 may be used to process a Joey 103 request. Further, for at least one embodiment, Joey 103 requests may be relegated to any desired priority. Such priority may be based upon information provided in one or more of the user database and/or history database.

It is to be appreciated that the process flows shown in FIGS. 4-7 and discussed above are for illustrative purposes only and are not to be considered limiting an embodiment of the present disclosure or an implementation thereof to any specific sequence of operations.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system, comprising:
a first user device communicatively coupled to a local area network; and
wherein the first user device comprises a first hardware processor configured to execute first, non-transient, computer instructions for facilitating a first seamless tuner engine;
wherein the first seamless tuner engine is configured to identify a first tuner;
a second user device communicatively coupled to the local area network;
wherein the second user device comprises a second hardware processor configured to execute second, non-transient, computer instructions for facilitating a second seamless tuner engine;
wherein the second seamless tuner engine is configured to identify a second tuner;
wherein each of the first seamless tuner engine and the second seamless tuner engine are further configured to respectively generate a first instance of a universal tuner directory and a second instance of the universal tuner directory; and
wherein each of the first instance of the universal tuner directory and the second instance of the universal tuner directory identifies availability of each of the first tuner and the second tuner.

2. The system of claim 1,
wherein each of the first instance of the universal tuner directory and the second instance of the universal tuner directory is populated based upon a request type.

3. The system of claim 2,
wherein the request type is a Joey request type;
wherein at least one of the first tuner and the second tuner may be configured as a linked main tuner;
wherein, for the Joey request type, an available linked main tuner is allocated to a Joey.

4. The system of claim 2,
wherein the request type is one of an auto-tune request type, a pay-per-view (PPV) request type, an original content request type, and a re-run request type;
wherein the auto-tune request type has a higher separate priority than the PPV request type.

5. The system of claim 4,
wherein the PPV request type has a higher priority than the original content request type.

6. The system of claim 4,
wherein the original content request type has a higher separate priority than the re-run request type.

7. The system of claim 1, further comprising:
a third user device communicatively coupled to the local area network;

wherein the third user device comprises a third hardware processor configured to execute third, non-transient, computer instructions for facilitating a third seamless tuner engine;
wherein the third seamless tuner engine is configured to identify a third tuner; and
wherein each of the first instance of the universal tuner directory and the second instance of the universal tuner directory is further configured to identify the third tuner as being available for use by at least one of the first user device, the second user device, and the third user device.

8. The system of claim 7,
wherein each of the first instance of the universal tuner directory and the second instance of the universal tuner directory identifies a separate priority for each requested use of each of the first tuner, the second tuner, and the third tuner.

9. The system of claim 1,
wherein the first user device further comprises:
a first data store further comprising:
a first tuner database configured to store first tuner information about the first tuner;
wherein the first tuner information identifies any first uses for the first tuner;
wherein the second user device further comprises:
a second data store further comprising:
a second tuner database configured to store second tuner information about the second tuner;
wherein the second tuner information identifies any second uses for the second tuner; and
wherein each of the first tuner information and the second tuner information are used to respectively populate each of the first instance of the universal tuner directory and the second instance of the universal tuner directory.

10. The system of claim 9,
wherein the first and second seamless tuner engines cooperatively process a new tuner request based upon the first uses, the second uses and a priority of the new tuner request.

11. The system of claim 10,
wherein the priority is one of an emergency broadcast message, an auto-tune, a pay-per-view, an original content, and a rerun.

12. The system of claim 10,
wherein, when the new tuner request is received from a Joey, the first seamless tuner engine is further configured to determine whether the first tuner is available for use as a linked main tuner.

13. The system of claim 1,
wherein the first user device further comprises:
a first data store configured to store user preference information in a user database; and
wherein the first computer instructions instruct the first seamless tuner engine to populate the first instance of the universal tuner directory in view of the user preference information.

14. A process, for seamless use of tuners provided by multiple devices within a local area network, comprising:
maintaining, by a first user device, a first user device tuner directory;
wherein the first user device tuner directory identifies a first tuner;
receiving, by the first user device and from a second user device, a second user device tuner directory;
wherein the second user device tuner directory identifies a second tuner;
generating, by the first user device, a first instance of a universal tuner directory based on contents of the first user device tuner directory and the second user device tuner directory;
sending, by the first user device to the second user device, the first user device tuner directory to facilitate generation by the second user device of a second instance of the universal tuner directory based on contents of the first user device tuner directory and the second user device tuner directory;
wherein each of the first instance of the universal tuner directory and the second instance of the universal tuner directory identify current tuner requests for each of the first tuner and the second tuner.

15. The process of claim 14,
wherein the second instance of the universal tuner directory is independently generated by the second user device.

16. The process of claim 14, further comprising:
prioritizing a new request based on a request type.

17. The process of claim 16, further comprising:
wherein the request type is selected from a highest to lowest ranked ordering comprising at least two or more of an emergency broadcast message, an auto-tune request, a PPV request, an original content request, a rerun request, and a Joey request.

18. The process of claim 17, further comprising:
second prioritizing the new request based on a received user identifier;
wherein a first user identifier is associated with the first user device;
wherein a second user identifier is associated with the second user device; and
giving the new request a highest priority when the received user identifier is the second user identifier and the new request is for use of the second tuner.

19. A user device, configured for use in facilitating seamless tuner use across multiple devices within a local area network, comprising:
a first tuner;
a hardware processor configured to execute non-transient computer instructions for facilitating a seamless tuner engine;
a data store for a tuner database;
an interface configured to communicatively couple the user device with a second user device over a local area network (LAN);
wherein the second user device includes a second tuner;
wherein the seamless tuner engine facilitates operations comprising:
establishing a session between the first user device and the second user device;
generating a first tuner directory identifying current and scheduled uses of the first tuner;
communicating, to the second user device, the first tuner directory;
receiving, from the second user device, a second tuner directory identifying current and scheduled uses of the second tuner;
generating, based on at least the first tuner directory and the second tuner directory, a first instance of a universal tuner directory identifying current and scheduled uses of each of the first tuner and the second tuner;
wherein the second user device is configured to generate, based on the first tuner directory and the second tuner directory, a second instance of the universal tuner directory; and wherein, during the session, use of the first tuner and the second tuner is prioritized based on at least a request type.

20. The user device of claim 19, wherein the request types include at least one of an auto-tune request, a pay-per-view request, an original content request, a re-run request, and a Joey request.

* * * * *